(12) United States Patent
Yang et al.

(10) Patent No.: US 9,380,231 B2
(45) Date of Patent: Jun. 28, 2016

(54) CORRELATED DOUBLE SAMPLING CIRCUIT AND IMAGE SENSOR INCLUDING THE SAME

(71) Applicant: SAMSUNG ELECTRONICS CO., LTD., Suwon-Si, Gyeonggi-Do (KR)

(72) Inventors: Han Yang, Seoul (KR); Sin-Hwan Lim, Hwaseong-Si (KR); Kyoung-Min Koh, Hwaseong-Si (KR); Jae-Cheol Yun, Seoul (KR); Kwang-Hyun Lee, Seongnam-Si (KR); Soon-Ik Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/595,317

(22) Filed: Jan. 13, 2015

(65) Prior Publication Data

US 2015/0237274 A1    Aug. 20, 2015

(30) Foreign Application Priority Data

Feb. 17, 2014    (KR) .................. 10-2014-0017584

(51) Int. Cl.
*H04N 5/357*    (2011.01)
*H04N 5/378*    (2011.01)

(52) U.S. Cl.
CPC ............. *H04N 5/3575* (2013.01); *H04N 5/378* (2013.01)

(58) Field of Classification Search
CPC .................................................. H04N 5/3575
USPC ........................................................ 348/308
See application file for complete search history.

(56) References Cited

U.S. PATENT DOCUMENTS

| | | | |
|---|---|---|---|
| 6,160,282 A | 12/2000 | Merrill | |
| 6,927,433 B2 | 8/2005 | Hynecek | |
| 6,963,060 B2 | 11/2005 | Knee et al. | |
| 7,133,074 B1 | 11/2006 | Brehmer et al. | |
| 7,145,494 B2 | 12/2006 | Mizuguchi et al. | |
| 7,253,461 B2 | 8/2007 | Yang et al. | |
| 7,265,329 B2 | 9/2007 | Henderson et al. | |
| 7,265,706 B2 | 9/2007 | Boemler | |
| 7,400,279 B2 | 7/2008 | Krymski | |
| 8,023,021 B2 | 9/2011 | Adkisson et al. | |
| 8,203,477 B2 | 6/2012 | Lee et al. | |
| 8,390,486 B2 | 3/2013 | Wang et al. | |
| 8,576,317 B2 | 11/2013 | Sakakibara et al. | |
| 2003/0107101 A1 | 6/2003 | Nishii et al. | |
| 2005/0174455 A1 | 8/2005 | Elmakias et al. | |
| 2009/0273392 A1* | 11/2009 | Korobeynikov | H03K 5/24 327/551 |
| 2011/0248149 A1* | 10/2011 | Sato | H04N 5/374 250/214 P |
| 2012/0008028 A1 | 1/2012 | Egawa | |
| 2012/0092536 A1 | 4/2012 | Hirota | |
| 2013/0215307 A1 | 8/2013 | Park et al. | |
| 2013/0300906 A1 | 11/2013 | Yan | |
| 2014/0070974 A1* | 3/2014 | Park | H03K 5/08 341/155 |

* cited by examiner

*Primary Examiner* — Gevell Selby
(74) *Attorney, Agent, or Firm* — Volentine & Whitt, PLLC

(57) ABSTRACT

A correlated double sampling (CDS) circuit may include a sampling circuit and a switching circuit. The CDS circuit may perform a CDS operation on a reset component of an input signal and an image component of the input signal based on a ramp signal, and the CDS circuit may generate an output signal. The switching circuit may include an auto-zero switch that connects a first input terminal receiving the input signal to an output node in response to an auto-zero control signal during an auto-zero interval. The switching circuit may connect a first terminal of the auto-zero switch to a reference voltage in order to cutoff a leakage current flowing to the auto-zero switch in response to a first boosting control signal during a first comparison interval and a second comparison interval. The output signal may be provided at the output node.

20 Claims, 17 Drawing Sheets

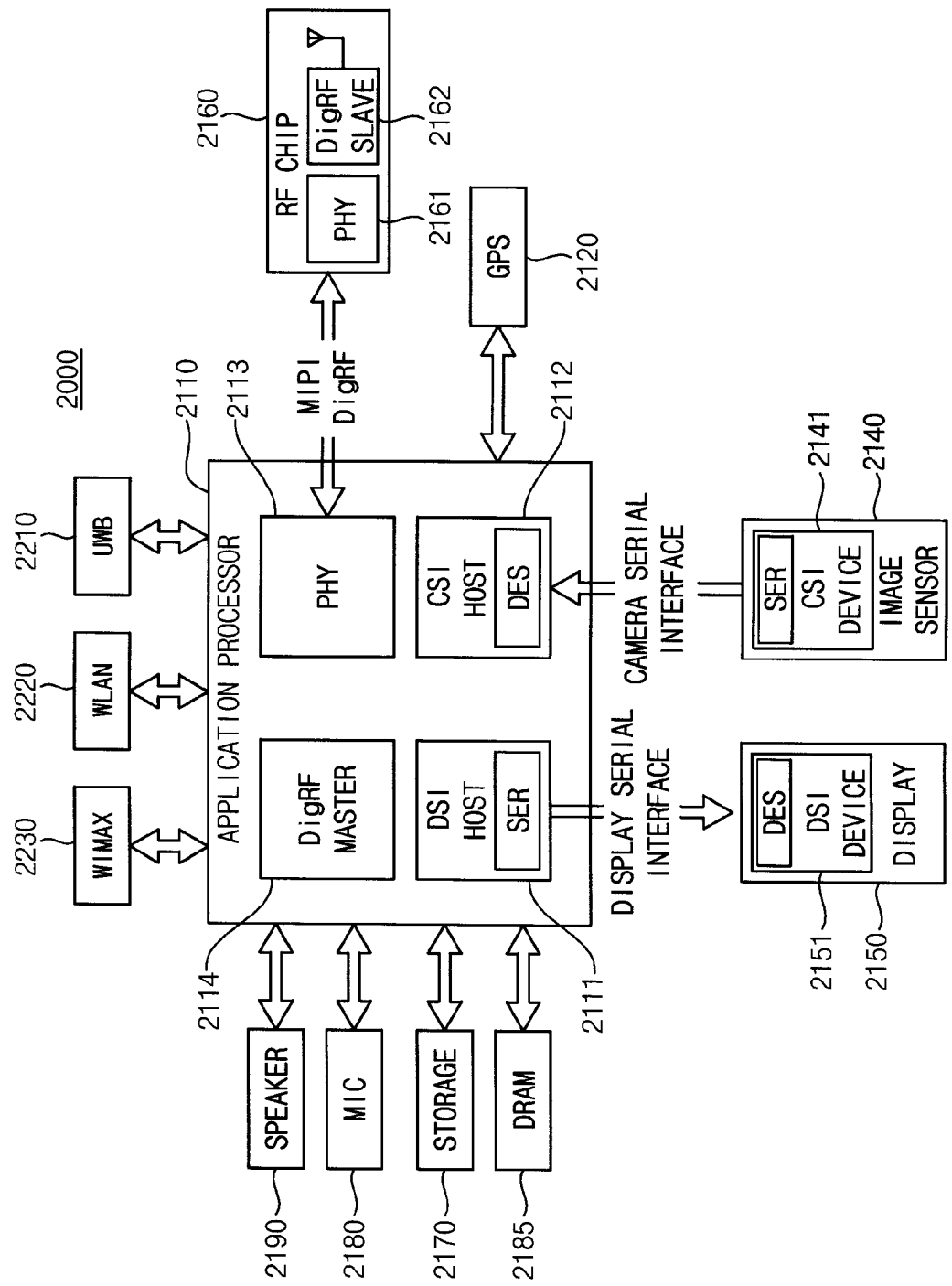

CORRELATED DOUBLE SAMPLING CIRCUIT AND IMAGE SENSOR INCLUDING THE SAME

CROSS-REFERENCE TO RELATED APPLICATIONS

A claim of priority under 35 USC §119 is made to Korean Patent Application No. 10-2014-0017584, filed on Feb. 17, 2014, the entire contents of which are hereby incorporated by reference.

BACKGROUND

The present inventive concept herein relates to correlated double sampling, and more particularly to correlated double sampling circuits and image sensors including the same.

Charge coupled device (CCD) image sensors and complementary metal-oxide semiconductor (CMOS) image sensors are devices commonly used for taking images. In general, analog pixel signals output from pixel arrays of CMOS image sensors may have variations such as fixed pattern noise (FPN) due to differences between intrinsic characteristics of the pixels. The fixed pattern noise (FPN) may be reduced by operating the CMOS image sensors using correlated double sampling (CDS) technology and techniques.

SUMMARY

Embodiments of the inventive concept provide a correlated double sampling (CDS) circuit capable of enhancing distortion by cutting off leakage current. Some embodiments of the inventive concept may provide an image sensor capable of reducing fixed pattern noise. The image sensor may employ the CDS circuit.

According to embodiments of the inventive concept, a CDS circuit may include a sampling circuit and a switching circuit. The CDS circuit may perform a CDS operation on a reset component of an input signal and an image component of the input signal based on a ramp signal. The CDS circuit may generate an output signal. The input signal is provided from a pixel array. The switching circuit may include an auto-zero switch that connects a first input terminal to an output node in response to an auto-zero control signal during an auto-zero interval. The switching circuit may connect a first terminal of the auto-zero switch to a reference voltage in order to cutoff a leakage current flowing to the auto-zero switch, in response to a first boosting control signal during a first comparison interval and a second comparison interval. An auto-zero interval may precede the first comparison interval. During the first comparison interval, a first comparison operation may be performed on the ramp signal and the reset component. During the second comparison interval, a second comparison operation may be performed on the ramp signal and the image component. The input signal is applied to the first input terminal, and the output signal is provided at the output node.

In some embodiments of the inventive concept, the sampling circuit may include a comparator that compares the ramp signal and the input signal to provide the output signal at the output node. The input signal is received at the first input terminal of the comparator, and the ramp signal is received at a second input terminal of the comparator.

The switching circuit may include the auto-zero switch that has the first terminal connected to a connection node and a second terminal connected to the first input terminal. The switching circuit may also include a first boosting switch connected between the connection node and the reference voltage, and a second boosting switch connected between the connection node and the output node.

The auto-zero control signal which is one of a plurality of switching control signals may be applied to the auto-zero switch. The first boosting control signal which is another one of the plurality of switching control signals may be applied to the first boosting switch, and a second boosting control signal which is also another one of the plurality of switching control signals may be applied to the second boosting switch.

The auto-zero control signal may turn on the auto-zero switch during the auto-zero interval. The first boosting control signal may be activated in a precharge interval preceding the first comparison interval, and the second boosting control signal may be activated complementarily with the first boosting control signal.

The auto-zero switch may include an n-channel metal-oxide semiconductor (NMOS) transistor connected between the first input terminal and the connection node. The NMOS transistor may have a gate that receives the auto-zero control signal and a body to which a ground voltage is applied.

The reference voltage may have a level of a power supply voltage.

The NMOS transistor may be turned off after the auto-zero interval in response to the auto-zero control signal.

The first boosting switch may connect the reference voltage to a first terminal of the NMOS transistor during and after the precharge interval in order to increase a threshold voltage of the NMOS transistor, in response to the first boosting control signal.

The second boosting switch may connect the connection node to the output node before the precharge interval and disconnect the connection node from the output node during and after the precharge interval, in response to the second boosting control signal.

In some embodiments of the inventive concept, the auto-zero switch may include a p-channel metal-oxide semiconductor (PMOS) transistor connected between the first input terminal and the connection node. The PMOS transistor may have a gate that receives the auto-zero control signal and a body to which the ground voltage is applied.

The reference voltage may have a level of the ground voltage.

The PMOS transistor may be turned off after the auto-zero interval in response to the auto-zero control signal.

The first boosting switch may connect the reference voltage to a first terminal of the PMOS transistor during and after the precharge interval in order to increase a threshold voltage of the PMOS transistor, in response to the first boosting control signal.

In some embodiments of the inventive concept, the comparator may include a bias unit connected between a power supply voltage and a first node, and a comparison unit connected between the bias unit and the ground voltage. The comparison unit may compare the ramp signal and the input signal to generate the output signal. The bias unit may include a first p-channel metal-oxide semiconductor (PMOS) transistor connected between the power supply voltage and the first node. The first PMOS transistor may adjust a current provided to the comparison unit, in response to a bias voltage which is applied to a gate of the first PMOS transistor. The comparison unit may include a second PMOS transistor which is connected to the first node and has a gate receiving the ramp signal, a third PMOS transistor which is connected to the first node in parallel with the second PMOS transistor and has a gate receiving the input signal, a first n-channel metal-oxide semiconductor (NMOS) transistor which has a drain connected to the second PMOS transistor at a second node and a source connected to the power supply voltage, and a second NMOS transistor which has a drain connected to the third PMOS transistor at a third node and a source connected to the ground voltage. The output signal may be provided at the third node, and the first and second NMOS transistors may have a current mirror configuration.

According to example embodiments of the inventive concept, a correlated double sampling (CDS) circuit may include a sampling circuit, a first switching circuit and a second switching circuit. The sampling circuit may perform a CDS operation on a reset component of an input signal and an image component of the input signal based on a ramp signal, and the sampling circuit may generate an output signal. The input signal is provided from a pixel array. The first switching circuit may include a first auto-zero switch that connects a first input terminal to a first output node in response to an auto-zero control signal during an auto-zero interval. The first switching circuit may connect a first terminal of the first auto-zero switch to a reference voltage in order to cutoff a leakage current flowing to the first auto-zero switch, in response to a first boosting control signal during a first comparison interval and a second comparison interval. The auto-zero interval may precede the first comparison interval. During the first comparison interval, a first comparison operation may be performed on the ramp signal and the reset component. During a second comparison interval, a second comparison operation may be performed on the ramp signal and the image component. The input signal may be applied to the first input terminal, and the output signal may be provided at the first output node. The second switching circuit may include a second auto-zero switch that connects a second input terminal to a second output node in response to the auto-zero control signal during the auto-zero interval. The second switching circuit may connect a first terminal of the second auto-zero switch to the reference voltage in order to cutoff a leakage current flowing to the second auto-zero switch in response to the first boosting control signal during the first comparison interval and the second comparison interval.

In some embodiments of the inventive concept, the sampling circuit may include a differential comparator that compares the ramp signal and the input signal to provide the output signal at the output node. The first output node may be connected to a positive output terminal of the differential comparator, the input signal may be received at the first input terminal, and the ramp signal may be received at the second input terminal. The second output node is connected to a negative output terminal of the differential comparator.

The first switching circuit may further include a first capacitor that is connected between the first input terminal and a negative input terminal of the differential comparator. The first capacitor may store the input signal. The second switching circuit may further include a second capacitor that is connected between the second input terminal and a positive input terminal of the differential comparator. The second capacitor may store the ramp signal.

According to example embodiments of the inventive concept, an image sensor may include a pixel array, a correlated double sampling (CDS) block and a digital signal generation unit. The pixel array may include a plurality of unit pixels that sense incident light to generate pixel signals corresponding to the incident light. The CDS block may perform a CDS operation on the pixel signals to generate output signals. The digital signal generation unit may perform a digital conversion operation on the output signals to generate digital signals corresponding to the output signals. The CDS block may include a plurality of CDS circuits. Each CDS circuit may be connected to each column line of the pixel array. Each of the CDS circuits may include a sampling circuit and a switching circuit. The CDS circuit may perform the CDS operation on a reset component of the pixel signal and an image component of the pixel signal based on a ramp signal, and the CDS circuit may generate the output signal. The switching circuit may include an auto-zero switch that connects a first input terminal to an output node in response to an auto-zero control signal during an auto-zero interval. The switching circuit may connect a first terminal of the auto-zero switch to a reference voltage in order to cutoff a leakage current flowing to the auto-zero switch, in response to a first boosting control signal during a first comparison interval and a second comparison interval. The auto-zero interval may precede the first comparison interval. During the first comparison interval, a first comparison operation may be performed on the ramp signal and the reset component. During the second comparison interval, a second comparison operation may be performed on the ramp signal and the image component. The pixel signal may be applied to the first input terminal, and the output signal may be provided at the output node.

Accordingly, in example embodiments of the inventive concept a CDS circuit may include an auto-zero switch that connects a first input terminal receiving an input signal to an output node in response to an auto-zero control signal during an auto-zero interval preceding first sampling. The CDS circuit may connect a first terminal of the auto-zero switch to a reference voltage in order to cutoff a leakage current flowing to the auto-zero switch in response to a first boosting control signal during first and second comparison intervals. During the first comparison interval, a first comparison operation may be performed on a ramp signal and a reset component of the input signal. During the second comparison interval, a second comparison operation may be performed on the ramp signal and an image component of the input signal.

BRIEF DESCRIPTION OF THE DRAWINGS

Illustrative, non-limiting example embodiments of the inventive concept will be more clearly understood from the following detailed description taken in conjunction with the accompanying drawings.

FIG. 19 is a block diagram illustrating an example of an interface used in a mobile device according to example embodiments of the inventive concept.

DETAILED DESCRIPTION

Figure 1:
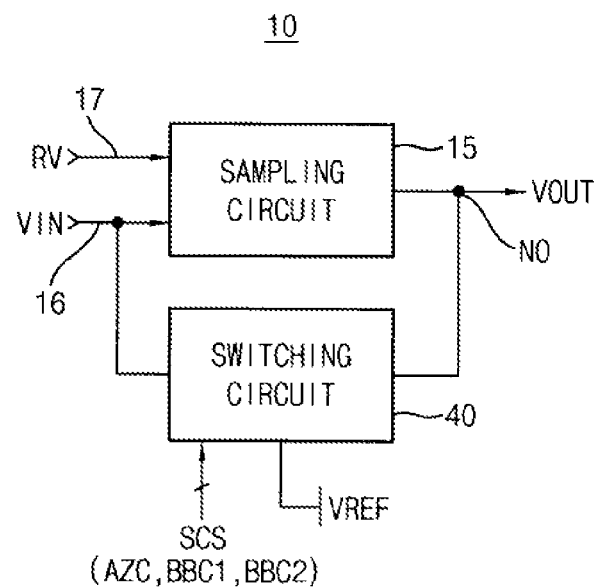
FIG. 1 is a block diagram illustrating a correlated double sampling (CDS) circuit according to embodiments of the inventive concept.

Various example embodiments will be described more fully with reference to the accompanying drawings, in which embodiments are shown. This disclosure may, however, be embodied in many different forms and should not be construed as limited to the embodiments set forth herein. Rather, these embodiments are provided so that this disclosure will be thorough and complete, and will fully convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, decimals, steps, operations, elements, and/or components, but do not preclude the presence or addition of one or more other.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a correlated double sampling (CDS) circuit according to example embodiments of the inventive concept.

A CDS circuit 10 illustrated in FIG. 1 may be applicable and usable with an image sensor to perform a CDS operation on an analog pixel signal that is output from a pixel array. Hereinafter, the example embodiments will be described below based on a complementary metal oxide semiconductor (CMOS) image sensor. However, the CDS circuit 10 according to other example embodiments of the inventive concept may be applicable and usable with a charge-coupled device (CCD) image sensor.

Referring to FIG. 1, the CDS circuit 10 may include a sampling circuit 15 and a switching circuit 40.

The sampling circuit 15 may perform a CDS operation on a reset component of an input signal VIN provided from a pixel array and an image component of the input signal VIN based on a ramp signal RV, and generate an output signal VOUT. An analog pixel signal (e.g., the input signal VIN) that is output from the pixel array may have variations such as fixed pattern noise (FPN) due to the intrinsic characteristics of the pixels, and/or due to variations in the characteristics of logic circuitry that output voltage signals from the pixels. Accordingly, an effective signal component can be extracted by calculating a difference between a voltage signal based on the reset component and a voltage signal based on the image component. As described above, the reset component and the image component may be detected, and the difference between the reset and image components may be extracted as the effective signal component, which is referred to as the CDS. The sampling circuit 15 may have a first input terminal 16 receiving the input signal VIN and a second input terminal 17 receiving the ramp signal RV. The sampling circuit 15 may provide the output signal VOUT at an output node NO.

The switching circuit 40 may be connected in parallel with the sampling circuit 15 between the first input terminal 16 and the output node NO. The switching circuit 40 may be connected to a reference voltage VREF. The switching circuit 40 may receive a plurality of switching control signals SCS. The plurality of switching control signals SCS may include an auto-zero control signal AZC, a first boosting control signal BBC1 and a second boosting control signal BBC2. The switching circuit 40 may connect the first input terminal 16 to the output node NO based on at least one of the plurality of switching control signals SCS such that the input signal VIN and the output signal VOUT can have the same voltage level during an auto-zero interval. In addition, the switching circuit 40 may disconnect the first input terminal 16 from the output node in order to reduce a leakage current that may occur in the switching circuit 40 during a first comparison interval and a second comparison interval, based on at least some of the plurality of switching control signals SCS. During the first comparison interval, a first comparison operation may be performed on the ramp signal RV and a reset component of the input signal VIN. During the second comparison interval, a second comparison operation may be performed on the ramp signal RV and an image component of the input signal VIN.

For reducing random noises of an output signal of a CDS circuit, a conventional image sensor may employ a multiple sampling technique of averaging noise by performing sampling with respect to a pixel signal, which is output from a pixel array, several times, and/or may employ a technique of improving a signal-to-noise ratio (SNR) characteristic by arranging a programmable gain amplifier (PGA) on the output path of the pixel signal. However, in the conventional image sensor employing the above conventional techniques or technologies, the complexity of the signal processing unit in the image sensor may be increased, and thus the size of the image sensor may be increased. In addition, a leakage current cannot be cut off, and thus the output signal is distorted due to the leakage current.

However, the CDS circuit 10 according to embodiments of the inventive concept may cut off the leakage current that may occur in the switching circuit 40 by disconnecting the first input terminal 16 from the output node NO after the auto-zero interval.

Figure 2A:
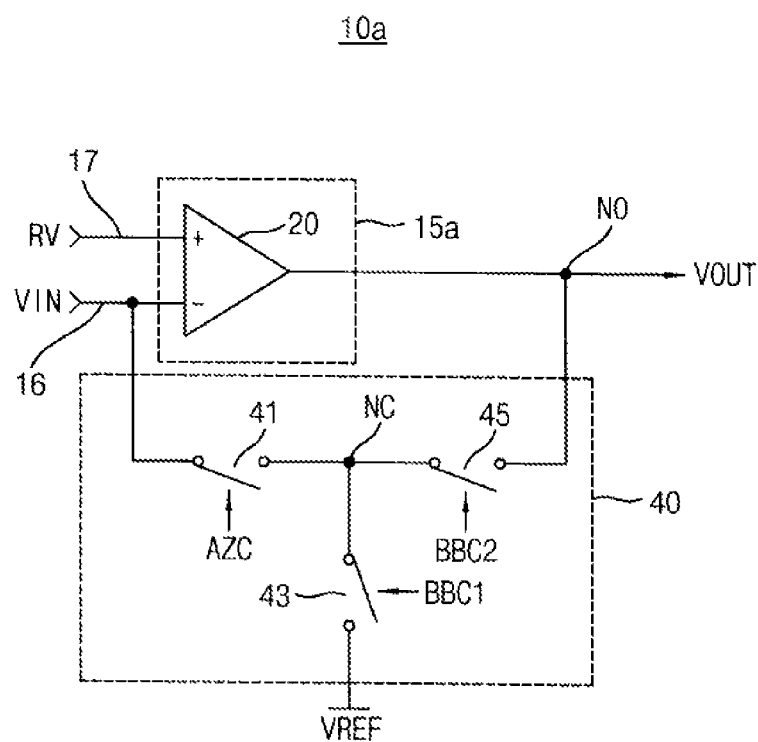
FIG. 2A is a circuit diagram illustrating an example of the CDS circuit of FIG. 1 according to example embodiments of the inventive concept.

FIG. 2A is a circuit diagram illustrating an example of the CDS circuit of FIG. 1 according to example embodiments of the inventive concept.

Referring to FIG. 2A, a CDS circuit 10a may include a sampling circuit 15a and the switching circuit 40. The sampling circuit 15a may include a comparator 20. The switching circuit 40 may include an auto-zero switch 41 and first and second boosting switches 43 and 45.

The comparator 20 may have a first (negative) input terminal receiving the input signal VIN, a second (positive) input terminal receiving the ramp signal RV and an output terminal (or, the output node NO) at which the output signal VOUT is provided.

The auto-zero switch 41 may be connected between the first input terminal 16 and a connection node NC, and may be switched in response to the auto-zero control signal AZC. The first boosting switch 43 may be connected between the connection node NC and the reference voltage VREF, and may be switched in response to the first boosting control signal BBC1. The second boosting switch 45 may be connected between the connection node NC and the output node NO, and may be switched in response to the second boosting control signal BBC2. The auto-zero switch 41 and the second boosting switch 45 may be connected in series between the first input terminal 16 and the output node NO.

The auto-zero switch 41 and the second boosting switch 45 may connect the first input terminal 16 to the output node NO, respectively in response to the auto-zero control signal AZC and the second boosting control signal BBC2 which are activated during the auto-zero interval. When the first input terminal 16 is connected to the output node NO, the input signal VIN and the output signal VOUT may have the same voltage level, and thus a reset noise of the input signal VIN and an offset of the comparator 20 may be cancelled. An activation interval of the second boosting control signal BBC2 may be longer than an activation interval of the auto-zero control signal AZC. The first boosting control signal BBC1 may be activated during and after a precharge interval following the auto-zero interval, and may connect the reference voltage VREF to a first terminal of the auto-zero switch 41. Since the first and second boosting control signals BBC1 and BBC2 are complementary to each other, the second boosting control signal BBC2 may be deactivated during and after the precharge interval, and may disconnect the connection node NC from the output node NO. Therefore, when the reference voltage VREF is applied to the first terminal of the auto-zero switch 41 during and after the precharge interval, the leakage current may be cut off. The leakage current may occur in the auto-zero switch 41 that disconnects the first input terminal 16 from the connection node NC.

Figure 2B:
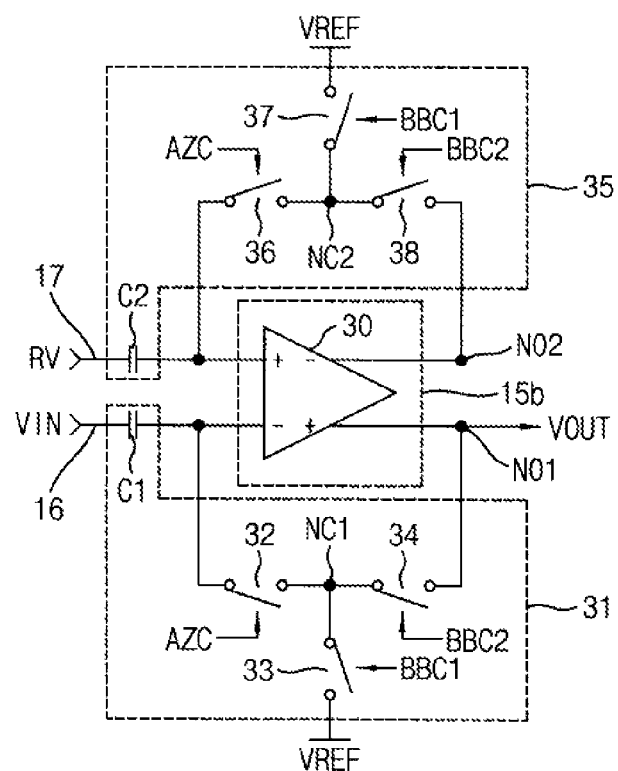
FIG. 2B is a circuit diagram illustrating another example of the CDS circuit of FIG. 1 according to example embodiments of the inventive concept.

FIG. 2B is a circuit diagram illustrating another example of the CDS circuit of FIG. 1 according to example embodiments of the inventive concept.

Referring to FIG. 2B, a CDS circuit 10b may include a sampling circuit 15b that employs a differential comparator 30, a first switching circuit 31 and a second switching circuit 35.

The differential comparator 30 may have a first (negative) input terminal receiving the input signal VIN, a second (positive) input terminal receiving the ramp signal RV, a first (positive) output terminal connected to a first output node NO1 at which the output signal VOUT is provided, and a second (negative) output terminal connected to a second output node NO2.

The first switching circuit 31 may include a capacitor C1, an auto-zero switch 32, and first and second boosting switches 33 and 34. The second switching circuit 35 may include a capacitor C2, an auto-zero switch 36, and first and second boosting switches 37 and 38.

The capacitor C1 may be connected between the first input terminal 16 and the negative input terminal of the differential comparator 30. The auto-zero switch 32 may be connected between one terminal of the capacitor C1 and a connection node NC1, and may be switched in response to the auto-zero control signal AZC. The first boosting switch 33 may be connected between the connection node NC1 and the reference voltage VREF, and may be switched in response to the first boosting control signal BBC1. The second boosting switch 34 may be connected between the connection node NC1 and the first output node NO1, and may be switched in response to the second boosting control signal BBC2. The auto-zero switch 32 and the second boosting switch 34 may be connected in series between the capacitor C1 and the first output node NO1.

The capacitor C2 may be connected between the second input terminal 17 and the positive input terminal of the differential comparator 30. The auto-zero switch 36 may be connected between one terminal of the capacitor C2 and a connection node NC2, and may be switched in response to the auto-zero control signal AZC. The first boosting switch 37 may be connected between the connection node NC2 and the reference voltage VREF, and may be switched in response to the first boosting control signal BBC1. The second boosting switch 38 may be connected between the connection node NC2 and the second output node NO2, and is switched in response to the second boosting control signal BBC2. The auto-zero switch 36 and the second boosting switch 38 may be connected in series between the capacitor C2 and the second output node NO2.

The auto-zero switch 32 and the second boosting switch 34 may connect the first input terminal 16 to the first output node NO1, respectively in response to the auto-zero control signal AZC and the second boosting control signal BBC2 which are activated during the auto-zero interval. The auto-zero switch 36 and the second boosting switch 38 may connect the second input terminal 17 to the second output node NO2, respectively in response to the auto-zero control signal AZC and the second boosting control signal BBC2 which are activated during the auto-zero interval.

When the negative input terminal of the differential comparator 30 is connected to the first output node NO1, the input signal VIN stored in the capacitor C1 and the output signal VOUT may have the same voltage level, and thus a reset noise of the input signal VIN and an offset of the differential comparator 30 may be cancelled. The activation interval of the second boosting control signal BBC2 may be longer than the activation interval of the auto-zero control signal AZC. The first boosting control signal BBC1 may be activated from a precharge interval following the auto-zero interval and may connect the reference voltage VREF to the first terminals of the auto-zero switches 32 and 36. Since the first and second boosting control signals BBC1 and BBC2 are complementary to each other, the second boosting control signal BBC2 may be deactivated from the precharge interval and may disconnect the connection nodes NC1 and NC2 from the first and second output nodes NO1 and NO2, respectively. Therefore, the reference voltage VREF may be applied to the first terminals of the auto-zero switches 32 and 36 from the precharge interval, respectively.

When the reference voltage VREF is applied to the first terminals of the auto-zero switches 32 and 36 from the precharge interval respectively, the leakage current may be cut off. The leakage may occur in the auto-zero switches 32 and 36 that disconnect the first input terminal 16 and the second input terminal 17 from the connection nodes NC1 and NC2, respectively. When the auto-zero switches 32 and 36 are implemented with a metal-oxide semiconductor (MOS) transistor and the reference voltage VREF is applied to the first terminals of the auto-zero switches 32 and 36 from the precharge interval, each threshold voltage of the auto-zero switches 32 and 36 may be increased because each body bias effect of the auto-zero switches 32 and 36 is strengthened. Therefore, the leakage current from the input signal VIN to the auto-zero switch 32 and the leakage current from the ramp signal RV to the auto-zero switch 36 may be cut off.

Figure 3:
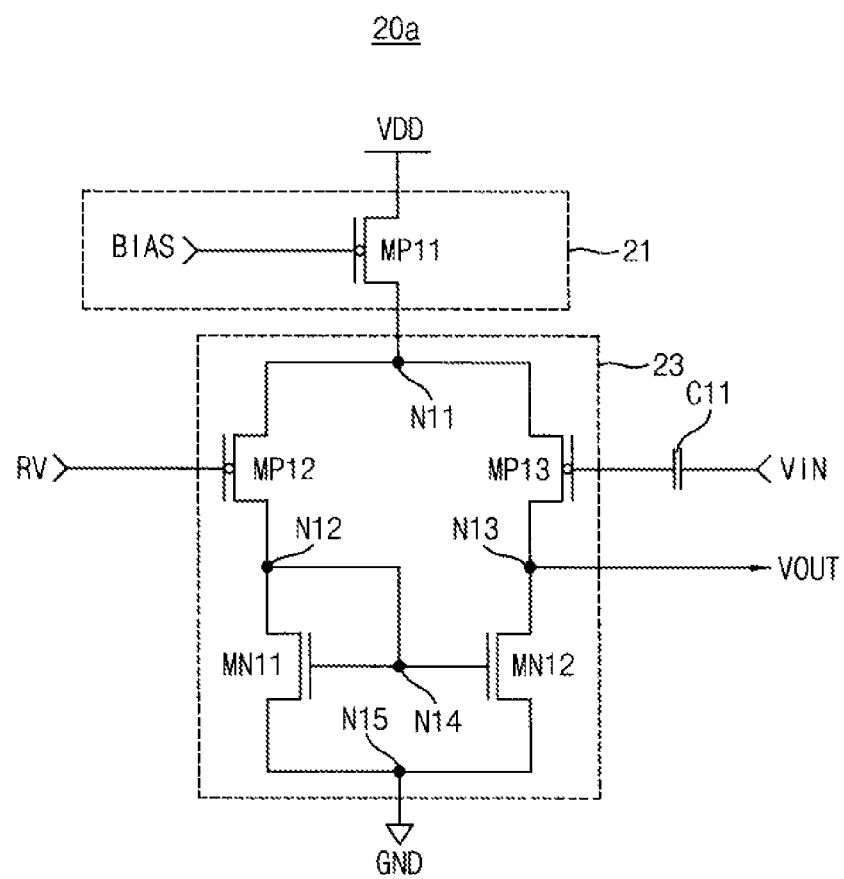
FIG. 3 is a circuit diagram illustrating an example of the comparator in FIG. 2A according to example embodiments of the inventive concept.

FIG. 3 is a circuit diagram illustrating an example of the comparator in FIG. 2A according to example embodiments of the inventive concept.

Referring to FIG. 3, comparator 20a may include a bias unit 21 and a comparison unit 23.

The bias unit 21 may be connected between a power supply voltage VDD and a first node N11. The comparison unit 23 may be connected between the first node N11 and a ground voltage GND. The comparison unit 23 may compare the input signal VIN and the ramp signal RV to generate the output signal VOUT. The bias unit 21 may include a p-channel metal-oxide semiconductor (PMOS) transistor MP11 connected between the power supply voltage VDD and the first node N11, and may adjust an amount of current provided to the comparison unit 23 in response to a bias voltage BIAS which is applied to a gate of the PMOS transistor MP11.

The comparison unit 23 may include PMOS transistors MP12 and MP13 and n-channel metal-oxide semiconductor (NMOS) transistors MN11 and MN12. The PMOS transistor MP12 may be connected between the first node N11 and a second node N12, and may have a gate receiving the ramp signal RV. The PMOS transistor MP13 may be connected between the first node N11 and a third node N13 in parallel with the PMOS transistor MP12, and may have a gate receiving the input signal VIN. The NMOS transistor MN11 may be connected between the second node N12 and a fifth node N15, and the NMOS transistor MN12 may be connected between the third node N13 and the fifth node N15. The NMOS transistors MN11 and MN12 may have a current mirror configuration. Gates of the NMOS transistors MN11 and MN12 may be connected to a fourth node N14, and the fourth node N14 may be connected to the second node N12. The fifth node N15 may be connected to the ground voltage GND, and the output signal VOUT may be provided at the third node N13.

The comparator 20a may further include a capacitor C11 connected to a gate of the PMOS transistor MP13. The capacitor C11 may remove a direct-current (DC) noise of the input signal VIN.

Figure 4:
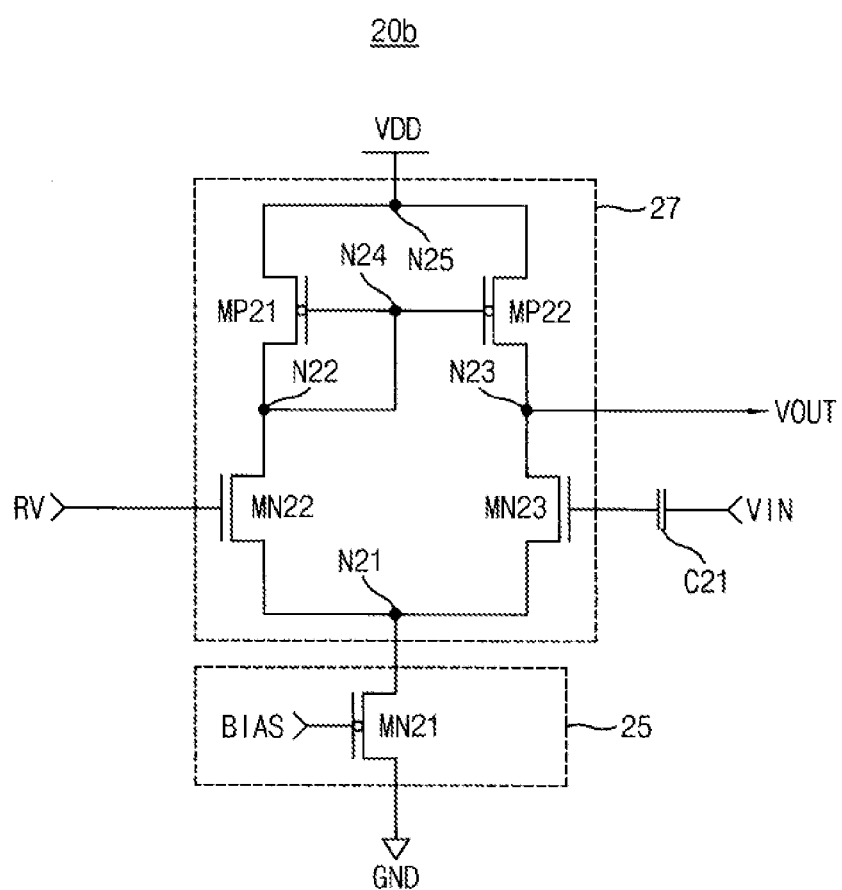
FIG. 4 is a circuit diagram illustrating another example of the comparator in FIG. 2A according to example embodiments of the inventive concept.

FIG. 4 is a circuit diagram illustrating another example of the comparator in FIG. 2A according to example embodiments of the inventive concept.

Referring to FIG. 4, a comparator 20b may include a bias unit 25 and a comparison unit 27.

The bias unit 25 may be connected between the ground voltage GND and a first node N21, and the comparison unit 27 may be connected between the first node N21 and the power supply voltage VDD. The comparison unit 27 may compare the input signal VIN and the ramp signal RV to generate the output signal VOUT. The bias unit 25 may include an NMOS transistor MN21 connected between the ground voltage GND and the first node N21, and may adjust an amount of current provided to the comparison unit 27 in response to a bias voltage BIAS which is applied to a gate of the NMOS transistor MN21.

The comparison unit 27 may include NMOS transistors MN22 and MN23 and PMOS transistors MP21 and MP22. The NMOS transistor MN22 may be connected between the first node N21 and a second node N22, and may have a gate receiving the ramp signal RV. The NMOS transistor MN23 may be connected between the first node N21 and a third node N23 in parallel with the NMOS transistor MN22, and may have a gate receiving the input signal VIN. The PMOS transistor MP21 may be connected between the second node N22 and a fifth node N25, and the PMOS transistor MP22 may be connected between the third node N23 and the fifth node N25. The PMOS transistors MP21 and MP22 may have a current minor configuration. Gates of the PMOS transistors MP21 and MP22 may be connected to a fourth node N24, and the fourth node N24 may be connected to the second node N22. The fifth node N25 may be connected to the power supply voltage VDD, and the output signal VOUT may be provided at the third node N23.

The comparator 20b may further include a capacitor C21 connected to a gate of the NMOS transistor MN23. The capacitor C21 may remove the DC noise of the input signal VIN.

Figure 5:
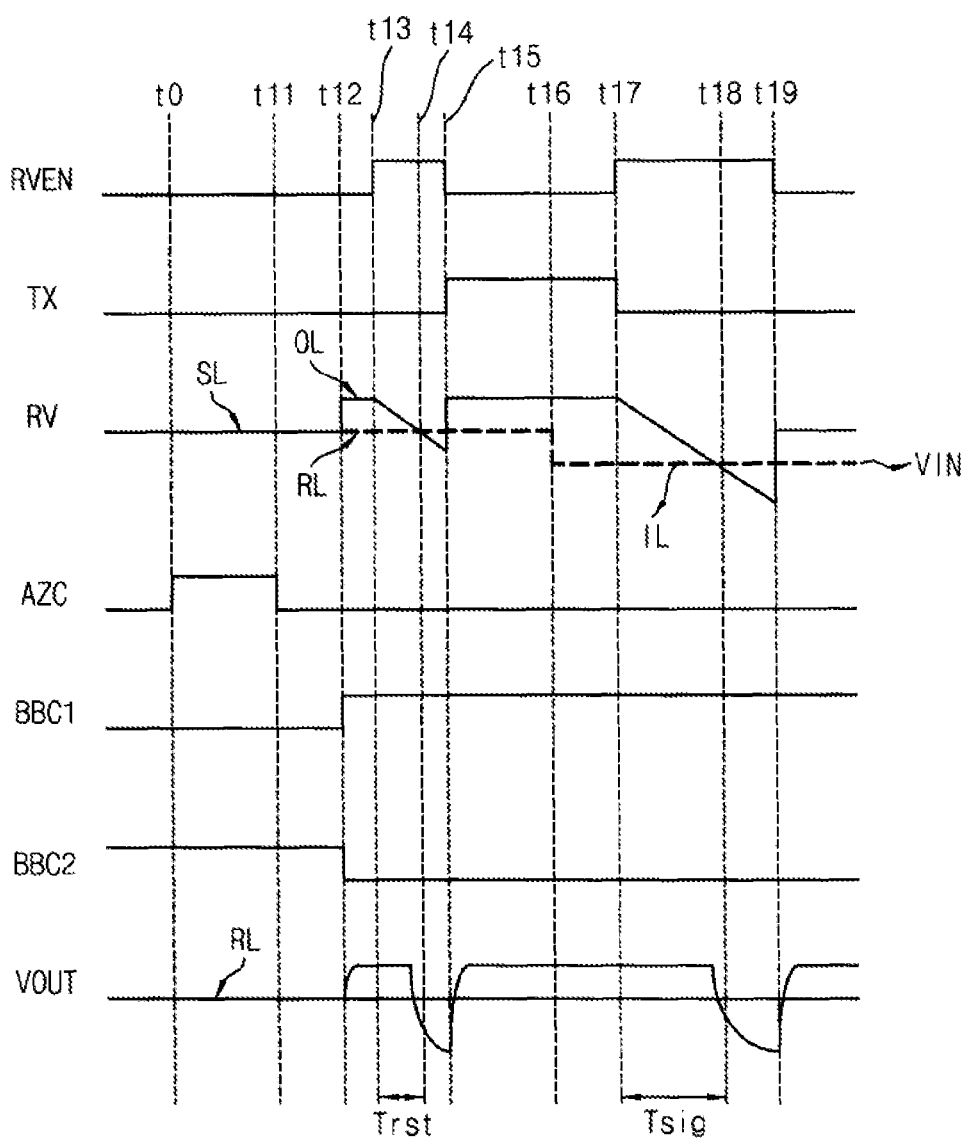
FIG. 5 is a timing diagram illustrating an operation of the CDS circuit of FIG. 2A.

FIG. 5 is a timing diagram illustrating an operation of the CDS circuit of FIG. 2A.

In FIG. 5, it is assumed that the comparator 20 of FIG. 2A employs the comparator 20a of FIG. 3.

Hereinafter, there will be description on an operation of the CDS circuit 10 with reference to FIGS. 2A, 3 and 5.

During an auto-zero interval between times t0~t11, the ramp signal RV may have a starting voltage level SL, and the input signal VIN may have the same reset level of the output signal VOUT because the first input terminal 16 and the output node NO of the comparator 20 are connected to each other in response to an activated auto-zero control signal AZC and the second boosting control signal BBC2. The starting voltage level SL may be substantially the same as the reset level. The auto-zero control signal AZC may be activated during the auto-zero interval and may transit to an inactive state at the time t11.

At a time t12, the ramp signal RV may have an offset level OL obtained by increasing the starting voltage level SL by a desired offset value. The offset level OL may be greater than the reset level. During a first precharge interval between times t12~t13, the ramp signal RV may have the offset level OL. In addition, the first boosting control signal BBC1 may transit to an active state (high level) and stay in the active state from the time t12. The second boosting control signal BBC2 may transit to an inactive state (low level) and stay in the inactive state from the time t12. Therefore, the reference voltage VREF may be applied to the first terminal of the auto-zero switch 41 from the first precharge interval.

At a time t13, a ramp enable signal RVEN may be activated, and the ramp signal RV may be activated during the first comparison interval between times t13~t15. The ramp enable signal RVEN may be applied to a ramp voltage generator 170 in FIG. 7. The ramp voltage generator 170 may provide the ramp signal RV based on the ramp enable signal RVEN.

Here, the phrase "a ramp enable signal RVEN may be activated" represents the transition of the ramp enable signal RVEN from a first logic level to a second logic level. In addition, the phrase "the ramp signal RV may be activated" represents that the ramp signal RV decreases with a desired gradient from the offset level OL.

During the first comparison interval, the comparator 21 may perform the first comparison operation on the ramp signal RV and the reset component of the input signal VIN to generate the output signal VOUT. Since the reference voltage VREF is applied to the first terminal of the auto-zero switch 41 from the first precharge interval, the leakage current may be prevent from influencing the input signal VIN. The leakage current may occur while the auto-zero switch 41 is turned off.

At time t15, the ramp enable signal RVEN may be deactivated, and the ramp signal RV may be deactivated to have the offset level OL during a second precharge interval between times t15~t17. During a transmission interval between time t15~t16, a transmission control signal TX may be activated to enable a transmission transistor included in a unit pixel of the pixel array, and a photo-electric conversion signal integrated at a photo diode may be diffused to a floating node. Meanwhile, photo-charges, which are generated in a photoelectric conversion region of the unit pixel, are transferred at time t6, and the level of the input signal VIN may be changed from the reset level RL to an image level IL corresponding to the image component.

At time t17, the ramp enable signal RVEN may be activated, and the ramp signal RV may be activated during the second comparison interval between times t17~t19.

During the second comparison interval, the comparator 20 may perform the second comparison operation on the ramp signal RV and the image component of the input signal VIN to generate the output signal VOUT. Since the reference voltage VREF is applied to the first terminal of the auto-zero switch 41 from the first precharge interval, the leakage current may be prevented from influencing the input signal VIN. The leakage current may occur while the auto-zero switch 41 is turned off. In addition, since it is assumed that incident light is applied to the pixel array, an analog-to-digital conversion timing Trst on the reset component may be smaller than an analog-to-digital conversion timing Tsig on the image component. At time t19, the ramp enable signal RVEN may be deactivated.

Figure 7:
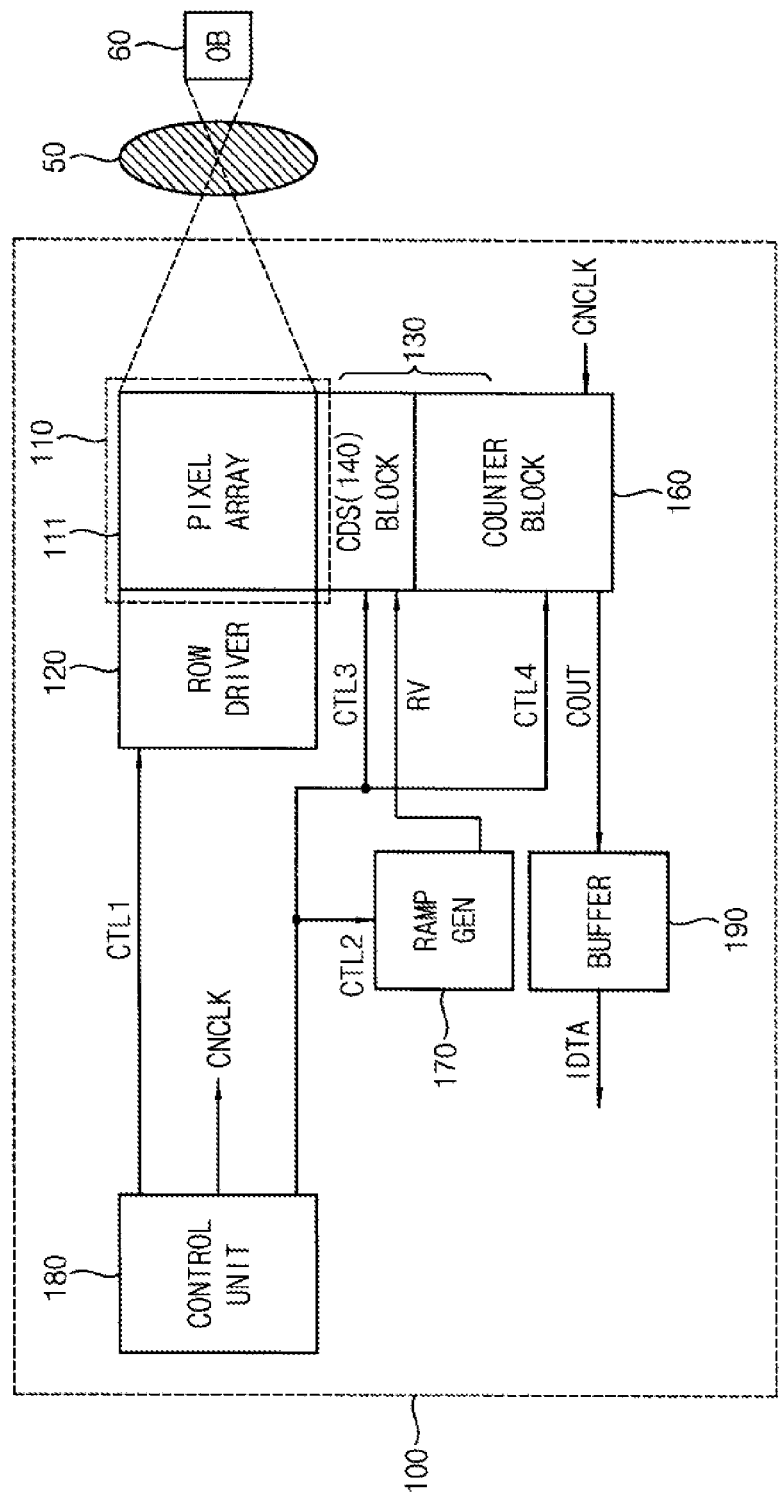
FIG. 7 is a block diagram illustrating an image sensor according to example embodiments of the inventive concept.

In FIG. 5, the ramp enable signal RVEN may be included in a control signal CTL2 in FIG. 7. The auto-zero control signal AZC and the first and second boosting control signal BBC1 and BBC2 may be included in a control signal CTL3 in FIG. 7.

Figure 6:
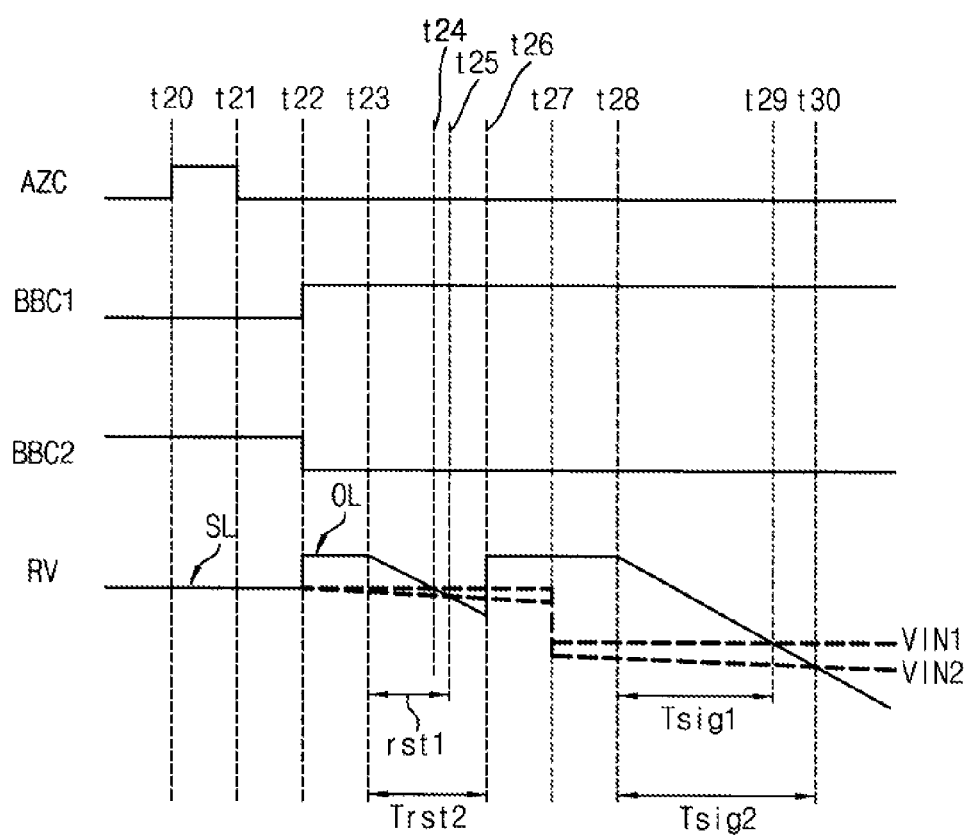
FIG. 6 is a timing diagram explaining operations of first and second boosting switches in the CDS circuit of FIG. 2A.

FIG. 6 is a timing diagram explaining operations of the first and second boosting switches in the CDS circuit of FIG. 2A.

Referring to FIGS. 2A and 6, the auto-zero control signal AZC applied to the auto-zero switch 41 may be activated during the auto-zero interval between times t20~t21. The first boosting control signal BBC1 applied to the first boosting switch 43 may be activated from a time t22. The second boosting control signal BBC2 applied to the second boosting switch 45 may be activated to the time t22 and be deactivated from the time t22. The ramp signal RV may have the starting voltage level SL to the time t22 and have the offset level OL during the first precharge interval between times t22~t23. The ramp signal RV may be activated between times t23~t26 and have the offset level OL during the second precharge interval between times t26~t28. The ramp signal RV may be activated from time t28.

In the CDS circuit 10 as in FIG. 2A, the first and second boosting switches 43 and 45 may cut off the leakage current of the auto-zero switch 41 from the first precharge interval. Therefore, the input signal VIN1 may be maintained at the reset level during an interval between times t20~t27, and may be maintained at the image level during an interval after time t27. However, in a conventional CDS circuit that includes only an auto-zero switch such as auto-zero switch 41 without first and second boosting switches such as first and second boosting switches 43 and 45, the level of the input signal VIN2 may gradually decrease from the reset level to time t27 due to the leakage current of the auto-zero switch 41, and may also gradually decrease from the image level from the time t27. Therefore, there may be a difference between analog-to-digital conversion timings Trst1 and Trst2 on the reset component, and there may also be a difference between analog-to-digital conversion timings Tsig1 and Tsig2 on the image component. Accordingly, in a conventional CDS circuit that includes only an auto-zero switch such as auto-zero switch 41 without first and second boosting switches such as first and second boosting switches 43 and 45, the output signal VOUT may be distorted because the input signal VIN2 is not maintained at a constant level during the first and second comparison intervals, which indicates that noises occur in digitally converted codes.

FIG. 7 is a block diagram illustrating an image sensor according to example embodiments of the inventive concept.

Referring to FIG. 7, an image sensor 100 may include a sensing unit 110 having a pixel array 111, a row driver 120, a CDS block 140, a counter block 160, a ramp signal generator 170, a control unit 180 and a buffer 190. The CDS block 140 and the counter block 160 may constitute an analog-to-digital converter (ADC) 130.

The image sensor 100 may be controlled in its operation by an image signal processor and may be used to optically sense an object 60 through a lens 50. The image signal processor may provide output data corresponding to the optically sensed object 60. The output data may then be communicated to a display unit that is capable of visually representing a display image in the likeness of the object 60. The display unit may include any of a computer, a mobile phone and the like.

The image signal processor may receive image data IDTA provided from the buffer 190 of the image sensor 100, and may perform certain data processing functions on the image data to improve the quality or define the properties of the image ultimately displayed by the display unit. The image signal processor may be disposed external to the image sensor 100 or may be disposed internal to the image sensor 100.

The pixel array 111 may include a plurality of photo sensitive devices such as photo diodes or pinned photo diodes. The pixel array 111 may sense some defined portion of the electromagnetic spectrum (hereafter, generically referred to as "light" recognizing that this term may include visible and not visible (e.g., infrared) components of the electromagnetic spectrum). The photo sensitive devices may detect and convert the light into corresponding analog signal(s) (hereafter, collectively and singularly referred to as "an image signal").

The control unit 180 may be used to provide control signals CLT1~CLT4 to the row driver 120, the ramp signal generator 170, the CDS block 140 and the counter block 160 to control their respective and interrelated operation(s). The control unit 180 may generate an input clock signals CNCLK to the counter block 160.

The row driver 120 may drive the pixel array 111 in row-wise units. For example, the row driver 120 may generate a row selection signal such as the control signal CTL1. In response to the row selection signal, the pixel array 111 may provide the CDS block 140 with a first analog signal corresponding to the reset component and a second analog signal corresponding to the image component.

The CDS block 140 may perform a CDS operation on the first and second analog signals based on the ramp signal RV. The CDS block 140 may include a plurality of CDS circuits. Each of the plurality of CDS circuits may be connected to each of a plurality of column lines, and each of the plurality of CDS circuits may include an auto-zero switch. The auto-zero switch may connect a first input terminal to an output node in response to an auto-zero control signal during an auto-zero interval preceding a first comparison interval.

Each of the plurality of CDS circuits may connect a first terminal of the auto-zero switch to a reference voltage in order to cutoff a leakage current flowing to the auto-zero switch in response to a first boosting control signal during a first comparison interval and a second comparison interval. During the first comparison interval, the first comparison operation may be performed on the ramp signal RV and the reset component. During the second comparison interval, a second comparison operation may be performed on the ramp signal RV and the image component. The CDS block 140 may perform the CDS operation in response to the control signal CTL3, and the control signal CTL3 may include the auto-zero control signal AZC and the first and second boosting control signals BBC1 and BBC2.

The counter block (also referred to as 'digital signal generation unit') 160 may include a plurality of counters. Each of the plurality of counters may be connected to each of the plurality of CDS circuits, and each counter may count the input clock signal CNCLK based on the output signal from the corresponding CDS circuit to generate a counter output signal COUT during each of the first and second comparison intervals.

The buffer 190 may temporarily store the counter output signal COUT from the counter block 160, and the buffer 190 may perform sense and amplification operations on the counter output signal COUT to generate corresponding image data IDTA to be output. Thus, in some embodiments, the buffer 190 may include a plurality of column memory blocks (e.g., static random access memories (SRAMs)) provided to store respective columns, and a sense amplifier provided to sense and amplify the counter output signal COUT from the counter block 160.

Figure 8:
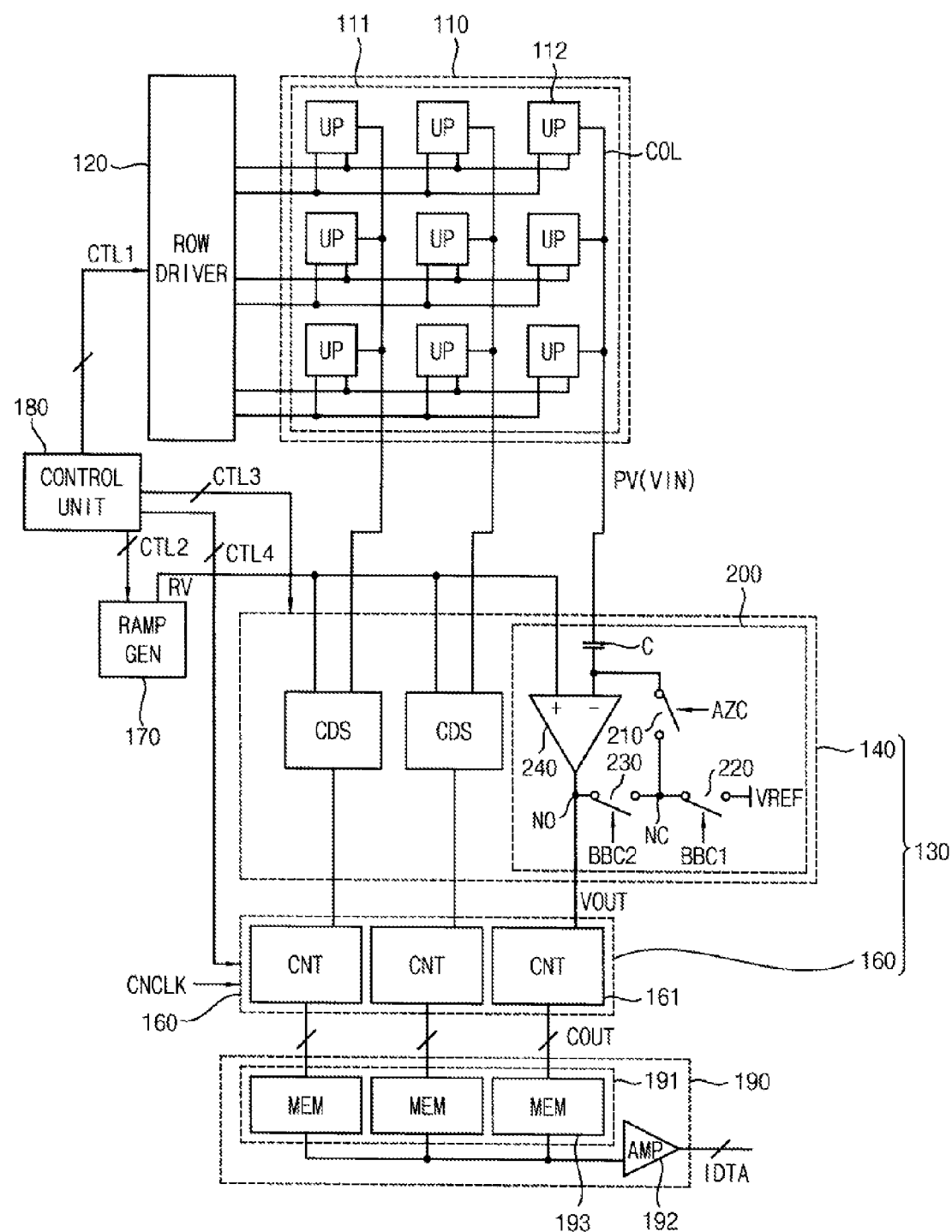
FIG. 8 further illustrates the image sensor of FIG. 7 according to example embodiments of the inventive concept.

FIG. 8 further illustrates the image sensor of FIG. 7 according to example embodiments of the inventive concept.

Referring to FIG. 8, the image sensor 100 may include the sensing unit 110 including the pixel array 111, the row driver 120, the CDS block 140, the counter block 160, the ramp signal generator 170, the control unit 180 and the buffer 190. The CDS block 140 and the counter block 160 may constitute the ADC 130.

The pixel array 111 may include a plurality of unit pixels 112 arranged in a matrix. Various sub-sets of the plurality of unit pixels 112 are connected in respective rows and columns among a plurality of row and a plurality of column The plurality of unit pixels 112 may include red pixels that convert light in a defined red spectrum into a corresponding electrical signal, green pixels that convert light in a defined green spectrum into a corresponding electrical signal, and a blue pixel that converts light in a defined blue spectrum into a corresponding electrical signal. In some embodiments, one or more color filter(s) may be included in relation to individual unit pixels 112 in order to filter incident light according to a particular spectrum.

The row driver 120 may be configured to receive and decode a row control signal CTL1 (e.g., an address signal) provided by (or through) the control unit 180, and select at least one row line among a plurality of row lines in the pixel array 111 in response to a decoded row control signal.

The CDS block 140 may be configured to perform a CDS operation on respective pixel output voltage PV (or the input signal VIN) provided by the individual unit pixels 112 connected (e.g.) to one of the column lines COL in the pixel array 111. The CDS block 140 may include a plurality of CDS circuits 200. Each of the plurality of CDS circuits 200 may be connected to each of a plurality of column lines COL. Each of the plurality of CDS circuits 200 may include an auto-zero switch 210. The auto-zero switch 210 may connect a first input terminal to an output node NO in response to an auto-zero control signal AZC during an auto-zero interval preceding the first comparison interval. Each of the plurality of CDS circuits may connect a first terminal of the auto-zero switch 210 to the reference voltage VREF in order to cutoff a leakage current flowing to the auto-zero switch 210 in response to the first boosting control signal BBC1 during the first comparison interval and the second comparison interval. During the first comparison interval, the first comparison operation may be performed on the ramp signal RV and the reset component of the input signal VIN. During the second comparison interval, the second comparison operation may be performed on the ramp signal RV and the image component of the input signal VIN.

Each of the plurality of CDS circuits 200 may include a sampling circuit that employs a comparator 240, a switching circuit that includes the auto-zero switch 210 and first and second boosting switches 220 and 230, and a capacitor C. The comparator 240 may perform the CDS operation on the reset component of the input signal VIN provided from the pixel array 111 and the image component of the input signal VIN based on the ramp signal RV, and may generate an output signal VOUT. The auto-zero switch 210 and the second boosting switch 230 may connect the first input terminal to the output node NO, respectively in response to the auto-zero control signal AZC and the second boosting control signal BBC2 which are activated during the auto-zero interval in order to reset the input signal VIN to the level of the output signal VOUT. The first boosting control signal BBC1 may be activated from a precharge interval following the auto-zero interval, and may connect the reference voltage VREF to a first terminal of the auto-zero switch 210 in order to cut off the leakage current flowing to the auto-zero switch 210. The capacitor C may cancel a direct current (DC) noise in the input signal VIN.

The counter block 160 may include a plurality of counters 161, and each of the plurality of counters 161 may be connected to the output terminal (output node NO) of the comparator 240. Each of the plurality of counters 161 may count the input clock signal CNCLK provided from the control unit 180, based on the output signal VOUT in order to provide the counter output signal COUT.

Each counter 161 may be an up/down counter or a bit-wise inversion counter. The bit-wise inversion counter may perform a similar operation to that of the up/down counter. For instance, the bit-wise inversion counter may perform up-counting and bit inversion to effectively implement a one's complement approach to counting. In this manner, the bit-wise inversion counter may perform reset counting and invert a result of the reset counting, such that the result is converted into a one's complement form, (i.e., a negative value).

The buffer 190 may include a column memory block 191 and a sense amplifier 192. The column memory block 191 may include a plurality of individual memories 193. The plurality of individual memories 193 may operate in response to a memory control signal provided by a memory controller (not shown). The plurality of individual memories 193 may be disposed within the column memory block 191 (or within the control unit 180) and may operate in response to a control signal provided by the control unit 180. In some embodiments, each of the plurality of individual memories 193 may be an SRAM.

In response to the memory control signal, the column memory block 191 may be used to temporarily store counter output signals COUT provided from the plurality of counters 161, and then may output the stored counter output signals COUT to the sense amplifier 192. The sense amplifier 192 may sense and amplify the counter output signals COUT, and the sense amplifier 192 may output the amplified counter output signals COUT as digital data IDTA or an image signal.

Figure 9:
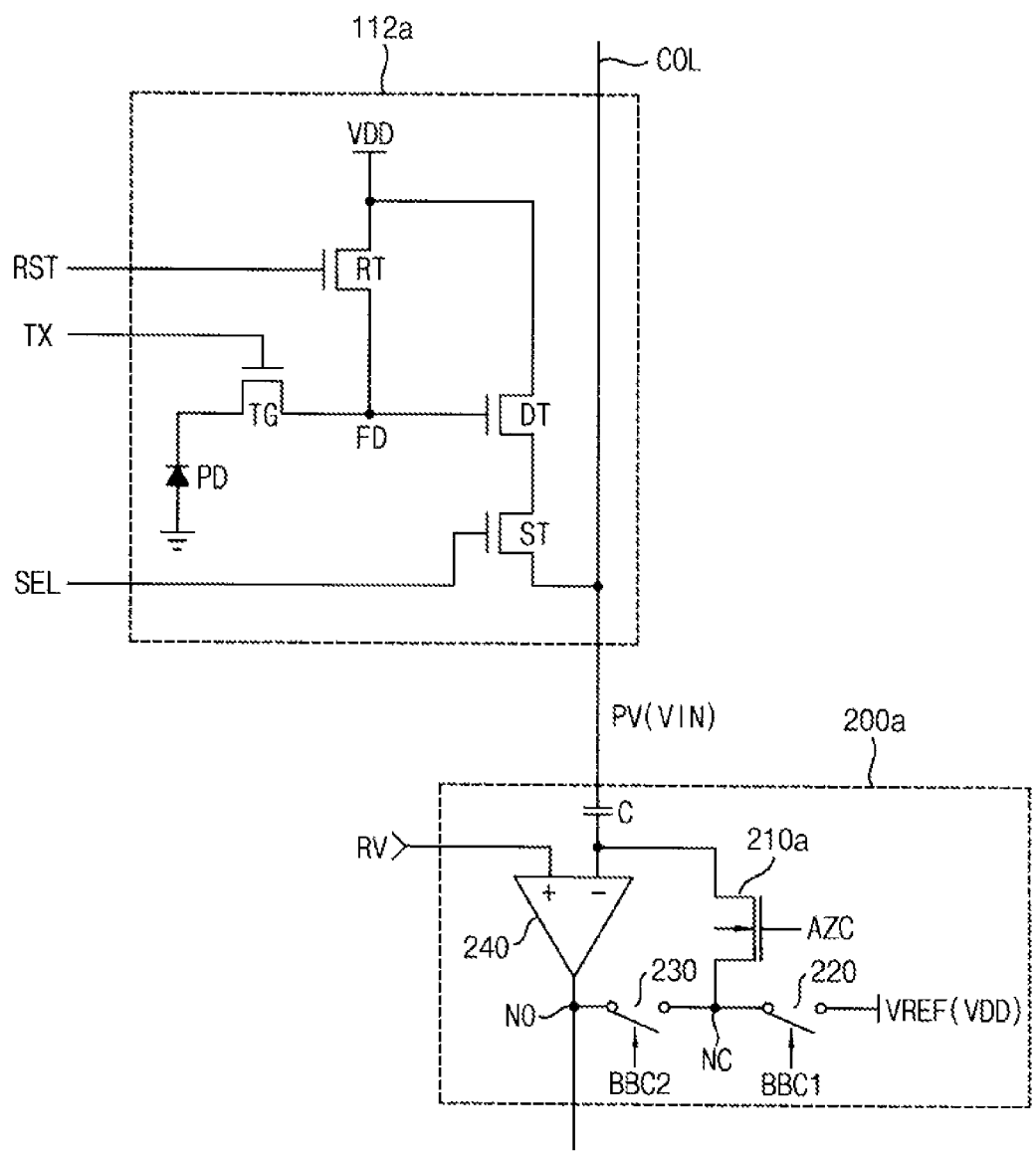
FIG. 9 illustrates a connection relationship between one unit pixel in a pixel array and one CDS circuit in the image sensor of FIG. 8, according to some embodiments of the inventive concept.

FIG. 9 illustrates a connection relationship between one unit pixel in the pixel array and one CDS circuit in the image sensor of FIG. 8, according to some embodiments of the inventive concepts.

In FIG. 9, the auto-zero switch 210 in FIG. 8 may be implemented with an NMOS transistor.

Referring to FIG. 9, a unit pixel 112a may include a photo sensitive device PD, a transfer transistor TG, a floating diffusion node FD, a reset transistor RT, a drive transistor DT, and a selection transistor ST.

The unit pixel 112a may include the photo sensitive device PD, the transfer transistor TG including a gate controlled by a transfer gate control signal TX to transfer a photoelectric conversion signal integrated at the photo sensitive device PD, a floating diffusion node FD storing the photoelectric conversion signal transferred through the transfer transistor TG or a reset signal, e.g., VDD transferred through a reset transistor RT including a gate controlled by a reset control signal RST, a drive transistor DT outputting a voltage of the floating diffusion node FD through a source using a source follower structure, and the selection transistor ST which is turned on according to a predetermined timing to output a signal generated by the unit cell 112a in response to a column selection signal SEL.

The photo sensitive device PD may include at least one among a photodiode, a photo transistor, a photo gate, a pinned photodiode (PPD), and a combination thereof.

Figure 12:
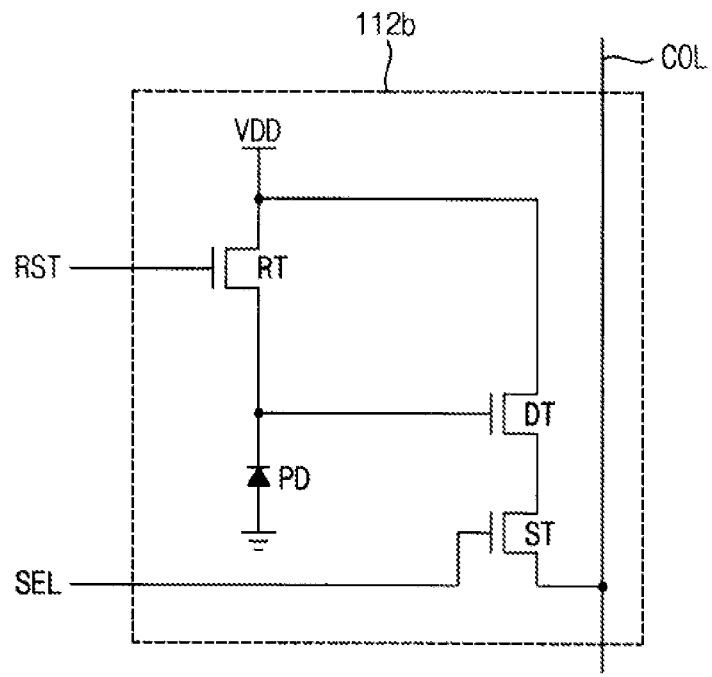
FIGS. 12, 13 and 14 are circuit diagrams of examples of a unit pixel which may be included in the pixel array in FIG. 8 according to example embodiments of the inventive concept.
Figure 13:
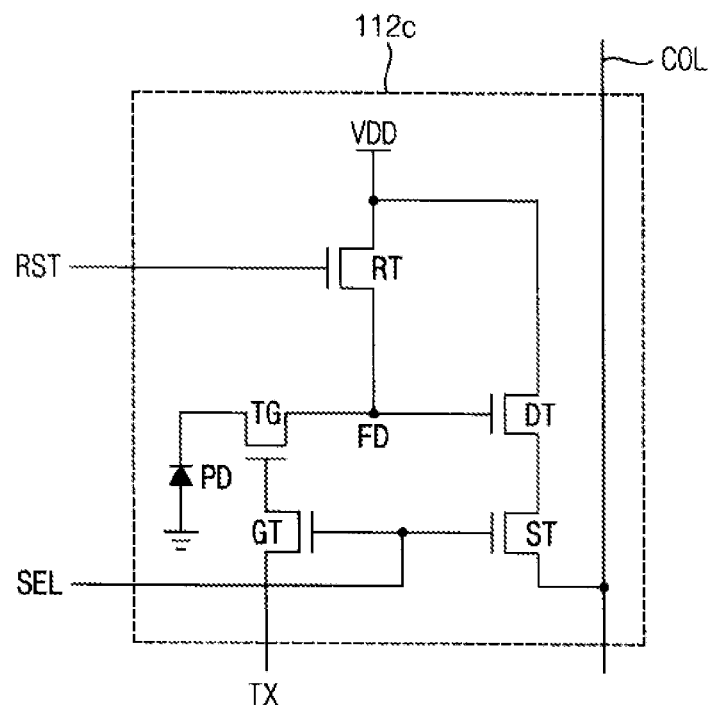
Figure 14:
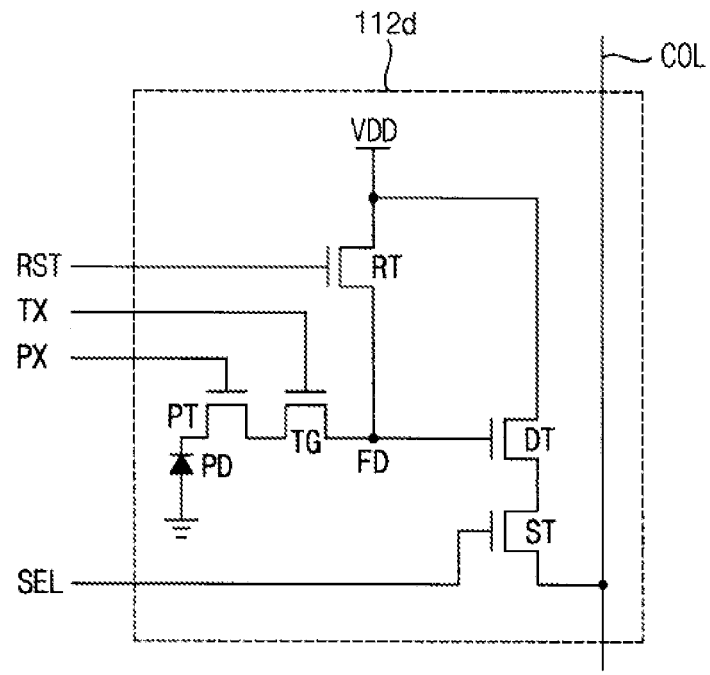

FIG. 9 illustrates a unit pixel having a four-transistor (4T) structure, which includes the single photo sensitive device PD and four MOS transistors TG, RT, DT, and ST, but the inventive concept is not restricted to the current embodiments. Embodiments of the inventive concept can be applied to any circuit including the photo sensitive device PD and at least three transistors including the drive transistor DT and the selection transistor ST. Pixels according to different embodiments of the present disclosure are illustrated in FIGS. 12 through 14.

A CDS circuit 200a may include the sampling circuit that includes the comparator 240, the switching circuit that includes the auto-zero switch 210a implemented with an NMOS transistor and the first and second boosting switches 220 and 230, and the capacitor C. The ground voltage may be applied to a body of the NMOS transistor. The comparator 240 may perform the CDS operation on the reset component and the image component of the input signal VIN based on the ramp signal RV in order to generate the output signal VOUT. The auto-zero switch 210a and the second boosting switch 230 may connect the first input terminal to the output node NO, respectively in response to the auto-zero control signal AZC and the second boosting control signal BBC2 which are activated during the auto-zero interval in order to reset the input signal VIN to the level of the output signal VOUT. The first boosting control signal BBC1 may be activated from the precharge interval following the auto-zero interval and connect the reference voltage VREF to a first terminal of the auto-zero switch 210a in order to cut off the leakage current flowing to the auto-zero switch 210a. The reference voltage VREF may have a level of the power supply voltage VDD.

Therefore, the NMOS transistor 210a may be turned off after the auto-zero interval, and the reference voltage VREF having a level of the power supply voltage VDD may be applied to a first terminal (i.e., a source) of the NMOS transistor 210a from the precharge interval following the auto-zero interval. Accordingly, the auto-zero control signal AZC having a low level may be applied to the gate of the NMOS transistor (the auto-zero switch) 210a, and the reference voltage VREF having a level of the power supply voltage VDD may be applied to the first terminal of the NMOS transistor 210a. A body effect of the NMOS transistor 210a may be proportional to a difference between a body voltage applied to the body of the NMOS transistor 210a and a source voltage applied to the first terminal of the NMOS transistor 210a. Therefore, the body effect in the NMOS transistor 210a may be strengthened, and a threshold voltage may be increased more than a case when the reference voltage VREF having a level of the power supply voltage VDD is not applied to the first terminal of the NMOS transistor 210a. When the threshold voltage of the NMOS transistor 210a is increased, leakage current from the input signal VIN to the NMOS transistor 210a may be cut off. Therefore, the noise may be prevented from the output signal VOUT and the output signal VOUT may be prevented from being distorted.

Figure 10:
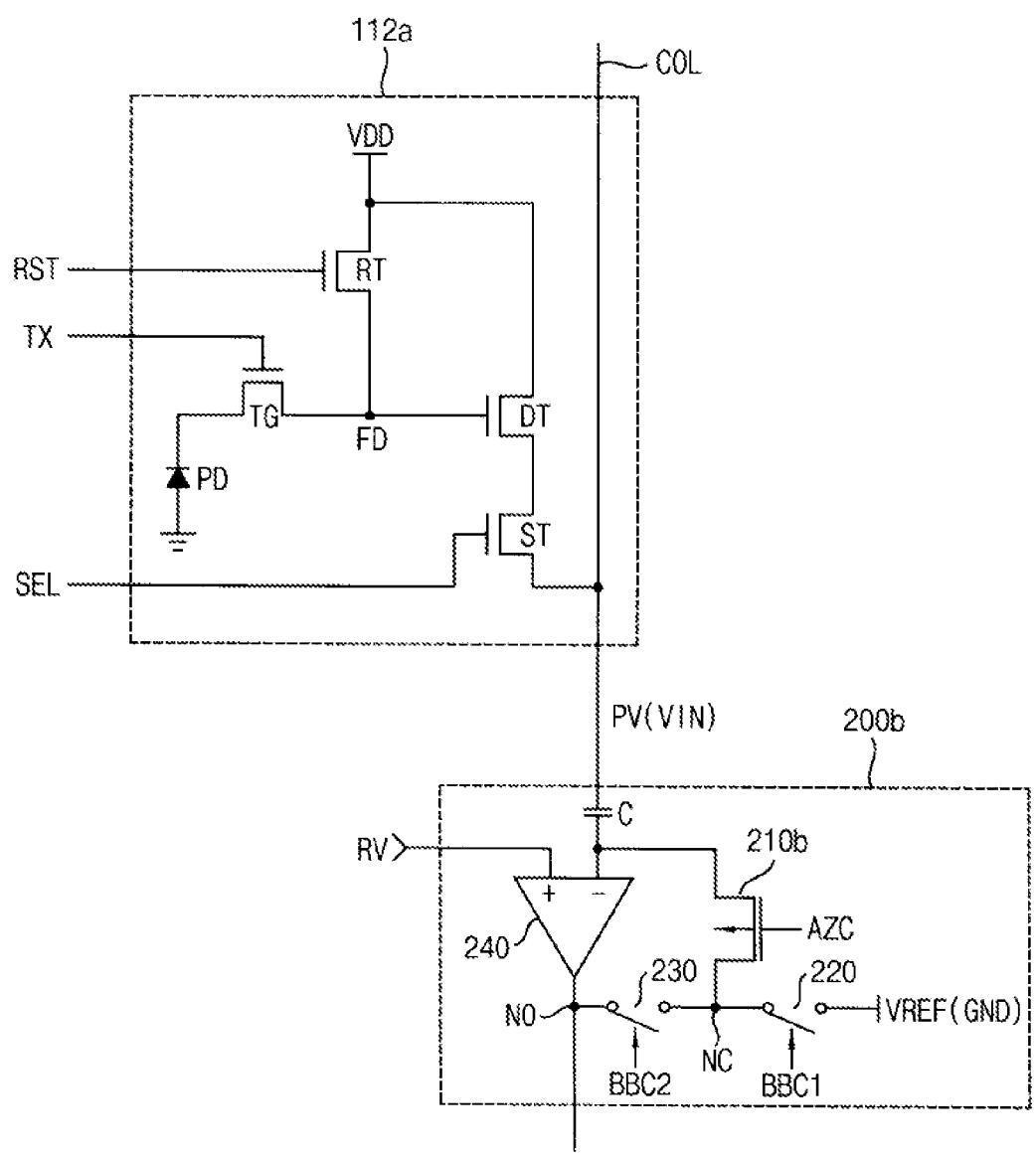
FIG. 10 illustrates a connection relationship between one unit pixel in the pixel array and one CDS circuit in the image sensor of FIG. 8, according to some embodiments of the inventive concept.

FIG. 10 illustrates a connection relationship between one unit pixel in the pixel array and one CDS circuit in the image sensor of FIG. 8, according to some embodiments of the inventive concept.

In FIG. 10, the auto-zero switch 210 in FIG. 8 is implemented with a PMOS transistor. The auto-zero control signal AZC may have waveforms complementary to the waveforms in FIGS. 5 and 6.

FIG. 10 is different from FIG. 9 in that a CDS circuit 200b is employed instead of the CDS circuit 200a.

The CDS circuit 200b may include the sampling circuit that includes the comparator 240, the switching circuit that includes the auto-zero switch 210b implemented with the PMOS transistor and the first and second boosting switches 220 and 230, and the capacitor C. The power supply voltage may be applied to a body of the PMOS transistor. The comparator 240 may perform the CDS operation on the reset component and the image component of the input signal VIN based on the ramp signal RV to generate the output signal VOUT. The auto-zero switch 210b and the second boosting switch 230 may connect the first input terminal to the output node NO, respectively in response to the auto-zero control signal AZC and the second boosting control signal BBC2 which are activated during the auto-zero interval in order to reset the input signal VIN to the level of the output signal VOUT. The first boosting control signal BBC1 may be activated from the precharge interval following the auto-zero interval and connect the reference voltage VREF to a first terminal of the auto-zero switch 210b in order to cut off the leakage current flowing to the auto-zero switch 210b. The reference voltage VREF may have a level of the ground voltage.

Therefore, the PMOS transistor 210b may be turned off after the auto-zero interval, and the reference voltage VREF having a level of the ground voltage may be applied to a first terminal (i.e., a source) of the PMOS transistor 210b from the precharge interval following the auto-zero interval. Accordingly, the auto-zero control signal AZC having a high level may be applied to the gate of the PMOS transistor (the auto-zero switch) 210b, and the reference voltage VREF having a level of the ground voltage may be applied to the first terminal of the PMOS transistor 210b. A body effect of the PMOS transistor 210b may be proportional to a difference between a body voltage applied to the body of the PMOS transistor 210b and a drain voltage applied to the first terminal of the PMOS transistor 210b. Therefore, the body effect in the PMOS transistor 210b may be strengthened, and a threshold voltage may be increased more than a case when the reference voltage VREF having a level of the ground voltage is not applied to the first terminal of the PMOS transistor 210b. When the threshold voltage of the PMOS transistor 210b is increased, the leakage current from the input signal VIN to the PMOS transistor 210b may be cut off. Therefore, the noise may be prevented from the output signal VOUT and the output signal VOUT may be prevented from being distorted.

Figure 11:
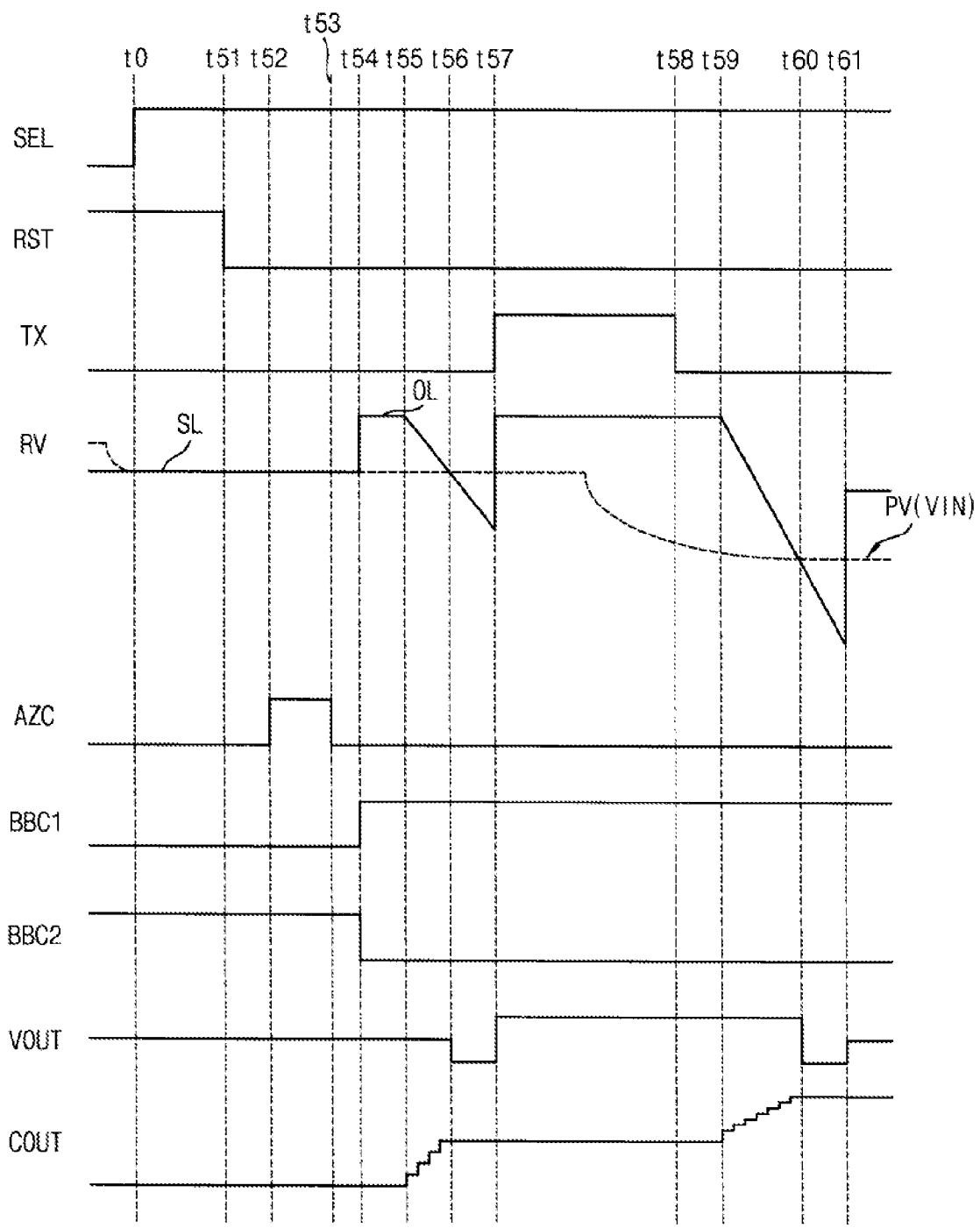
FIG. 11 is a timing diagram illustrating an operation of the image sensor of FIG. 8.

FIG. 11 is a timing diagram illustrating an operation of the image sensor of FIG. 8.

In FIG. 11, it is assumed that the unit pixel 112 employs the unit pixel 112a of FIG. 9, and the CDS circuit 200 in FIG. 8 employs the CDS circuit 200a in FIG. 9. That is, in FIG. 11, it is assumed that the auto-zero switch 210 in FIG. 8 employs the NMOS transistor 210a and the reference voltage VREF has the level of the power supply voltage as in FIG. 9.

Referring to FIGS. 8, 9 and 11, at time t0, the column selection signal SEL applied to the selection transistor ST may be activated, and the reset signal RST may be deactivated at time t51. During an auto-zero interval between times t52~t53, the ramp signal RV may have a starting voltage level SL, and the input signal VIN may have a same reset level of the output signal VOUT because the first input terminal and the output node NO of the comparator 240 are connected to each other in response to the activated auto-zero control signal AZC and the activated second boosting control signal BBC2. The starting voltage level SL may be substantially the same as the reset level.

At time t54, the ramp signal RV may have an offset level OL obtained by increasing the starting voltage level SL by a desired offset value. The offset level OL may be higher than the reset level. During a first precharge interval between times t54~t55, the ramp signal RV may have the offset level OL.

From the first precharge interval, since the first boosting control signal BBC1 is activated and the second boosting control signal BBC2 is deactivated, the reference voltage VREF having the level of the power supply voltage VDD may be applied to the source of the NMOS transistor 210a. Therefore, the body effect of the NMOS transistor 210 may be strengthened from the first precharge interval, and the threshold voltage of the NMOS transistor 210a may be increased to cut off the leakage current that may flow from the input signal VIN to the second terminal of the NMOS transistor 210a. Therefore, the noise may be prevented from the output signal VOUT, and the output signal VOUT may be prevented from being distorted.

The ramp signal RV may be activated during a first comparison interval between times t55~t58. Here, the phrase "the ramp signal RV may be activated" represents that the ramp signal RV decreases with a desired gradient from the offset level OL. During the first comparison interval, the comparator 240 may perform the first comparison operation on the ramp signal RV and the reset component of the input signal VIN to generate the output signal VOUT. During an interval between times t55~t56 in which the ramp signal RV is greater than the input signal VIN, the counter 161 may count the input clock signal CNCLK to generate a counter output signal COUT with respect to the reset component. Since the threshold voltage is increased from the first precharge interval, the counter output signal COUT may not include a distorted component due to the leakage current.

The ramp signal RV may be deactivated to have the offset level OL during a second pracharge interval between times t57~t59. During a transmission interval between time t57~t58, the transmission control signal TX may be activated to enable a transmission transistor TG, and photo-electric conversion signal integrated at the photo diode PD may be diffused to a floating node FD.

During a second comparison interval between times t59~t61, the ramp signal RV may be activated. During the second comparison interval, the comparator 240 may perform the second comparison operation on the ramp signal RV and the image component of the input signal VIN to generate the output signal VOUT. During an interval between times t59~t60 in which the ramp signal RV is greater than the input signal VIN, the counter 161 may count the input clock signal CNCLK to generate the counter output signal COUT with respect to the image component. Since the threshold voltage is increased from the first precharge interval, the counter output signal COUT may not include a distorted component due to the leakage current. At time t61, the ramp signal RV may have the starting voltage level SL.

FIGS. 12, 13 and 14 are circuit diagrams of examples of a unit pixel which may be included in the pixel array in FIG. 8 according to example embodiments of the inventive concept.

A unit pixel 112b illustrated in FIG. 12 may have a three-transistor (3T) structure and include a photo sensitive device PD, a reset transistor RT, a drive transistor (or a source follower transistor) DT, and a selection transistor ST.

A unit pixel 112c illustrated in FIG. 13 may have a five-transistor (5T) structure and include another transistor GT receiving the transmission control signal TX in addition to the photo sensitive device PD, the transfer transistor TG, the reset transistor RT, the drive transistor (or the source follower transistor) DT, and the selection transistor ST.

A unit pixel 112d illustrated in FIG. 14 may have the 5T structure and include two more transistors PT and TG receiving a pass control signal PX and a transmission control signal TX, respectively, in addition to the photo sensitive device PD, the reset transistor RT, the drive transistor (or the source follower transistor) DT, and the selection transistor ST.

Various types of pixel cells as shown in FIGS. 9, 12 through 14 may have an independent structure, as described above, or may share at least one element with each other. For instance, in the structure illustrated in FIG. 9, two or four pixels may include only the photo sensitive device PD and the transfer transistor TG independently, and may share the other elements with one another and independently operate through timing control.

Figure 15:
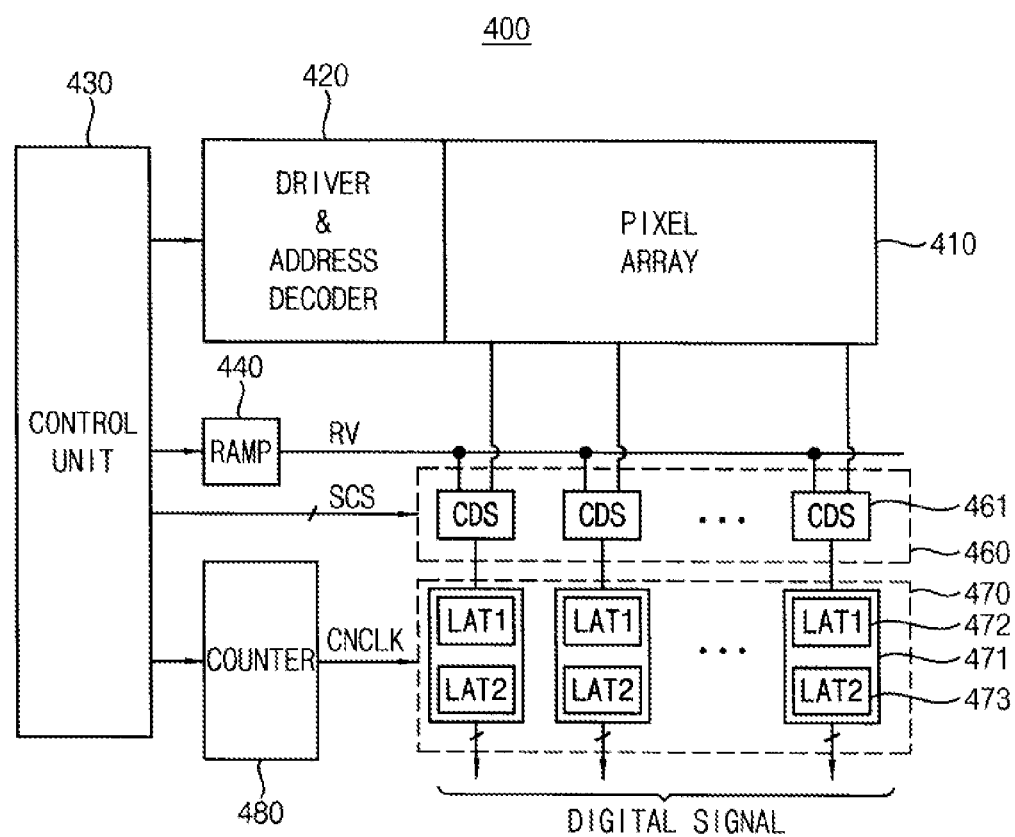
FIG. 15 is a block diagram illustrating an example of an image sensor according to example embodiments of the inventive concept.

FIG. 15 is a block diagram illustrating an example of an image sensor according to example embodiments of the inventive concept.

Referring to FIG. 15, an image sensor 400 may include a pixel array 410, a driver/address decoder 420, a control unit 430, a ramp signal generator 440, a CDS block 460, a latch unit (or digital signal generation unit) 470 and a global counter 480.

The driver/address decoder 420 may control an operation of the pixel array 410 by units of a column and/or a row. The control unit 430 may generate control signals for controlling operations of the other components of the image sensor 400.

In the image sensor 400 of FIG. 15, the latch unit 470 is configured for digital double sampling. The latch unit 470 may include a plurality of latch circuits 471 for a column, and each of the plurality of latch circuits 471 may include a respective first latch 472 and a respective second latch 473. The pixel array 410 may sequentially generate a first analog voltage representing a respective reset component and a second analog voltage representing a respective measured image component for each column. In first sampling, the CDS block 460 may compare the first analog voltage with the ramp signal RV provided from the ramp signal generator 440 in order to generate a respective comparison signal having a transition time point corresponding to the level of the reset component. A counter clock signal CNCLK from the global counter 480 may be commonly provided to all of the plurality of latch circuits 471. The respective first latch 472 may latch the counter clock signal CNCLK at the transition time point of the respective comparison signal to store a digital signal with respect to the reset component in the respective first latch 472.

In second sampling, the CDS block 460 may compare the second analog voltage with the ramp signal RV provided from the ramp signal generator 440 in order to generate a respective comparison signal having a transition time point corresponding to the level of the image component. The respective second latch 473 may latch the counter clock signal CNCLK at the transition time point of the respective comparison signal to store the digital signal with respect to the image component in the respective second latch 473. Digital values latched by the first and second latches 472 and 473 during the first and second samplings may be provided to internal logic circuits that calculate a difference of the digital values in order to determine a final image component in a digital form for digital double sampling in the image sensor 400.

Each CDS circuit 461 in the CDS block 460 may employ the CDS circuit 10 of FIG. 2A. Therefore, each CDS circuit 461 may include an auto-zero switch that connects a first input terminal to an output node in response to an auto-zero control signal during an auto-zero interval preceding the first sampling. Each CDS circuit 461 may connect a first terminal of the auto-zero switch to the reference voltage in order to cutoff a leakage current flowing to the auto-zero switch in response to the first boosting control signal during the first sampling and the second sampling. The auto zero control signal and the first and second boosting control signals may be included in switching control signals SCS provided from the control unit 430.

Figure 16:
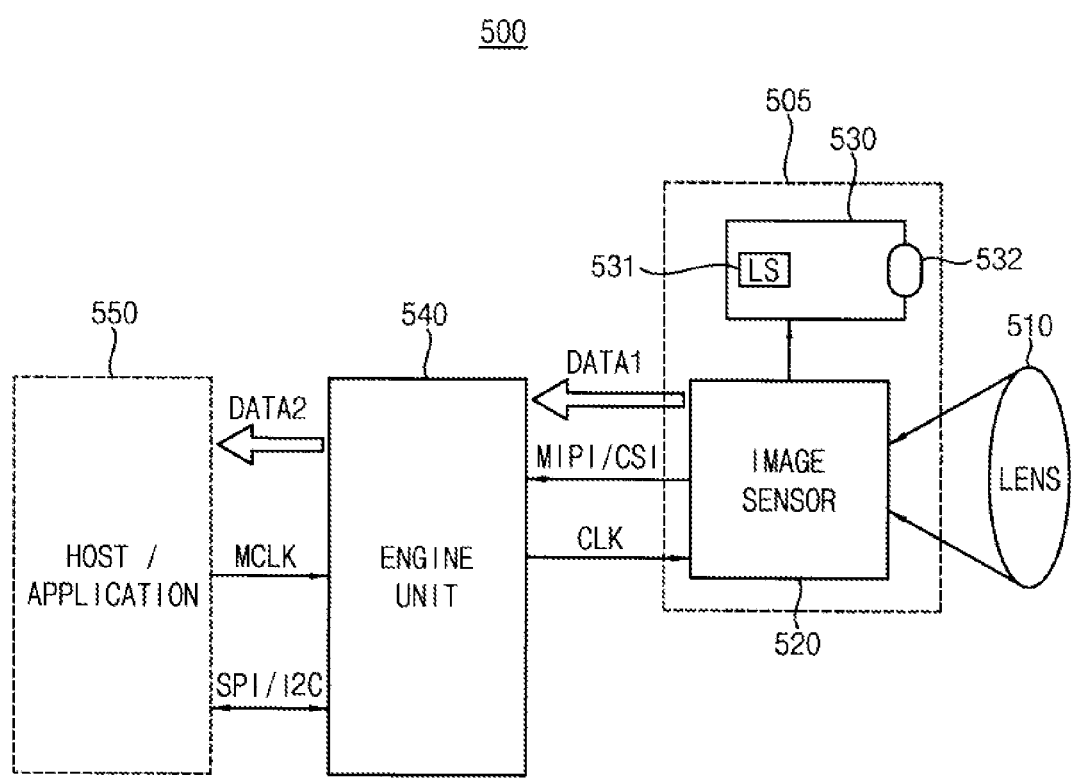
FIG. 16 is a block diagram illustrating an example of a camera including the image sensor according to example embodiments of the inventive concept.

FIG. 16 is a block diagram illustrating an example of a camera including the image sensor according to example embodiments of the inventive concept.

Referring to FIG. 16, a camera (also referred to as an image pick-up device) 500 may include a receiving lens 510, an image sensor chip 505 and an engine unit 540. The image sensor chip 505 may include an image sensor 520 and a light source module 530. In some embodiments, the image sensor 520 and the light source module 530 may be implemented as separate devices, or may be implemented such that at least one component of the light source module 530 is included in the image sensor 520. The light source module 530 may include a light source 531 and a lens 532. The image sensor 520 may employ the image sensor 100 of FIG. 8, and may include a sensing unit that employs a pixel array, a row driver, a CDS block, a counter block, a ramp signal generator, a control unit and a buffer. The image sensor 520 may employ the image sensor 400 of FIG. 15.

The CDS block may include a plurality of CDS circuits as illustrated in FIG. 2. Each of the plurality of CDS circuits may include a sampling circuit that is implemented with a comparator, and a switching circuit that includes an auto-zero switch and first and second boosting switches. Therefore, the image sensor 520 may include the auto-zero switch that connects a first input terminal to an output node in response to an auto-zero control signal during an auto-zero interval preceding a first comparison interval. The image sensor 520 may connect a first terminal of the auto-zero switch to a reference voltage in order to cutoff a leakage current flowing to the auto-zero switch in response to a first boosting control signal during a first comparison interval and a second comparison interval. During the first comparison interval, a first comparison operation may be performed on the ramp signal and the reset component, and during the second comparison interval, a second comparison operation may be performed on the ramp signal and the image component.

The receiving lens 510 may focus incident light on a photo-receiving region (for example, the pixel array 111 in FIG. 8) of the image sensor 520. The image sensor 520 may generate data DATA1 including depth information and/or color image information based on the incident light passing through the receiving lens 510. For example, the data DATA1 generated by the image sensor 520 may include depth data generated using infrared light or near-infrared light emitted by the light source module 530, and red, green, blue (RGB) data of a Bayer pattern generated using external visible light. The image sensor 520 may provide the data DATA1 to the engine unit 540 in response to a clock signal CLK. In some embodiments, the image sensor 520 may interface with the engine unit 540 using a mobile industry processor interface (MIPI) and/or a camera serial interface (CSI) for example.

The engine unit 540 may control the image sensor chip 505. The engine unit 540 may process the data DATA1 received from the image sensor 520. For example, the engine unit 540 may generate color data based on the received data DATA1. In other examples, the engine unit 540 may generate luminance, chrominance (YUV) data including a luminance component (Y), a difference between the luminance component and a blue component (U), and a difference between the luminance component and a red component (V) based on the RGB data, or may generate compressed data, such as Joint Photographic Experts Group (JPEG) data for example. The engine unit 540 may be coupled to a host/application 550, and may provide data DATA2 to the host/application 550 based on a master clock signal MCLK. In some embodiments, the engine unit 540 may interface with the host/application 550 using a serial peripheral interface (SPI) and/or an inter integrated circuit (I2C) interface.

Figure 17:
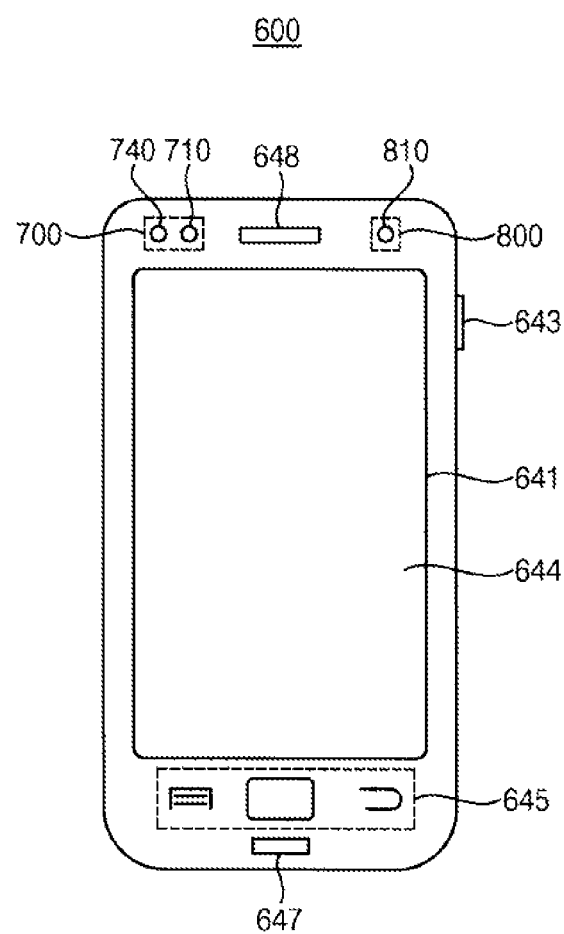
FIG. 17 is a plan view illustrating a mobile device according to example embodiments of the inventive concept.

FIG. 17 is a plan view illustrating a mobile device according to example embodiments of the inventive concept.

Referring to FIG. 17, the mobile device 600 may include a 3D image sensor 700, a 2D image sensor 800 and a display device 641. The mobile device 600 may further include a touch screen 644, buttons 643 and 645, a microphone 647 and a speaker 648.

The 3D image sensor 700 may be installed on a first surface (for instance, a front surface) of the mobile device 600. The 3D image sensor 700 may perform a first sensing to detect proximity of a subject, and a second sensing to recognize a gesture of the subject by acquiring distance information for the subject. The 3D image sensor 700 may include a sensing unit 710 having a plurality of depth pixels and a light source unit 740 to emit infrared ray or near-infrared ray.

The 2D image sensor 800 may be installed on the first surface of the mobile device 600 and perform a third sensing to acquire color image information for the subject. The 2D image sensor 800 may include a second sensing unit 810 having a plurality of color pixels.

In the example embodiment of FIG. 17, the 3D image sensor 700 and the 2D image sensor 800 may be prepared as two integrated circuit chips separated from each other. That is, the mobile device 600 may include two sensing modules. In this case, the depth pixels and the color pixels may constitute two pixel arrays separated from each other.

The display device 641 may be installed on the first surface of the mobile device 600 to display the results of the first sensing, the second sensing and the third sensing.

Figure 18:
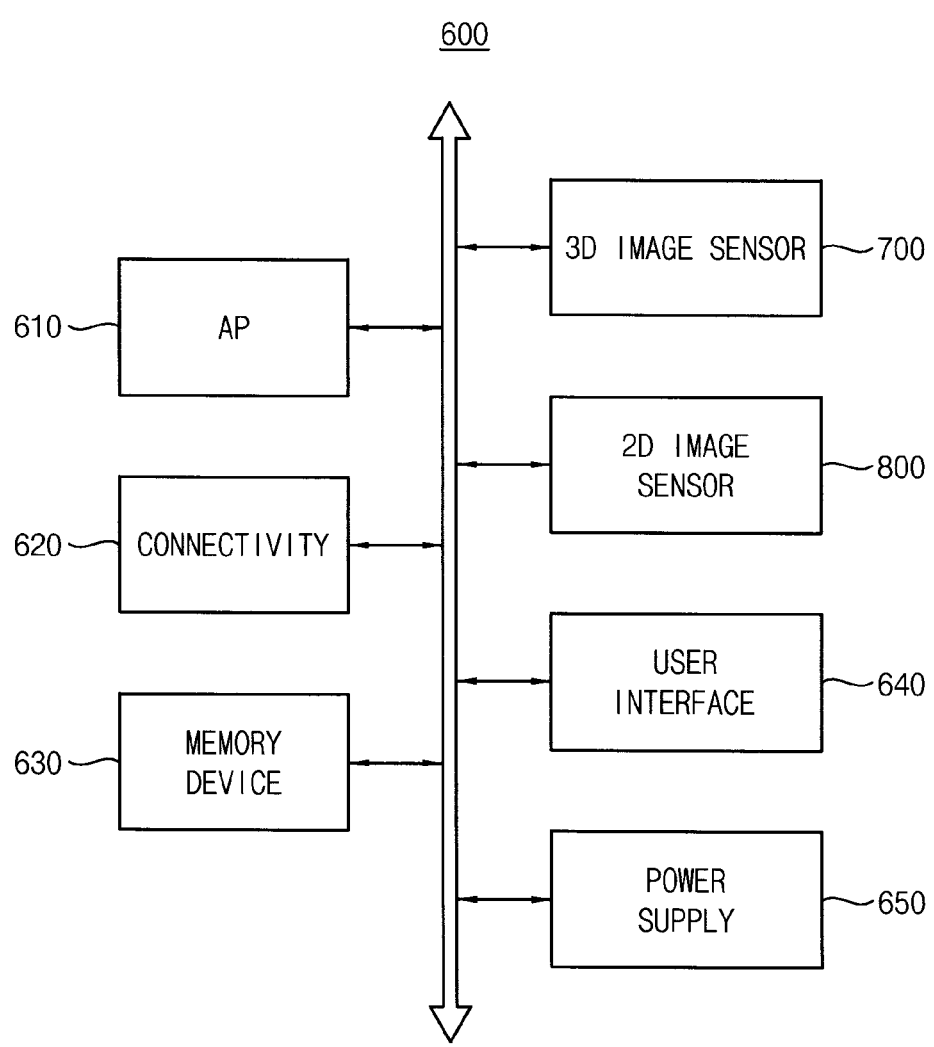
FIG. 18 is a block diagram illustrating an example of the mobile device shown in FIG. 17, according to some embodiments of the inventive concept.

FIG. 18 is a block diagram illustrating an example of the mobile device shown in FIG. 17, according to some embodiments of the inventive concept.

Referring to FIG. 18, the mobile device 600 may include an application processor 610, a connectivity unit 620, a memory device 630, a 3D image sensor 700, a 2D image sensor 800, a user interface 640 and a power supply 650. According to example embodiments, the mobile device 600 may be a mobile system, such as a mobile phone, a smart phone, a tablet PC, a laptop computer, a personal digital assistant (PDA), a portable multimedia player (PMP), a digital camera, a music player, a portable game console or a navigation system.

The application processor 610 may execute an operating system (OS) to operate the mobile device 600. In addition, the application processor 610 may execute various applications to provide any of an internet browser, a game and a dynamic image. According to example embodiments, the application processor 610 may include a single core or multi-cores. In addition, according to example embodiments, the application processor 610 may further include a cache memory positioned inside or outside the application processor 610.

The connectivity unit 620 may communicate with external devices. For instance, the connectivity unit 620 can perform Universal Serial Bus (USB) communication, Ethernet communication, Near Field Communication (NFC), Radio Frequency Identification (RFID) communication, mobile telecommunication or memory card communication. For instance, the connectivity unit 620 may include a baseband chipset and may support communications, such as GSM, GPRS, WCDMA and HSxPA.

The memory device 630 may store data processed by the application processor 610 or may operate as a working memory. In addition, the memory device 630 may store a bottom image for booting the mobile device 600, a file system related to the operating system to operate the mobile device 600, a device driver related to external devices connected to the mobile device 600, and the applications executed in the mobile device 600. For instance, the memory device 630 may include a volatile memory, such as dynamic random access memory (DRAM), static random access memory (SRAM), a mobile DRAM, a double data rate (DDR) synchronous DRAM (SDRAM), a low power DDR (LPDDR) SDRAM, a graphic DDR (GDDR) SDRAM or a rambus DRAM (RDRAM), or may include a nonvolatile memory, such as an electrically erasable programmable read-only memory (EEPROM), a flash memory, a phase change random access memory (PRAM), a resistance random access memory (RRAM) (Resistance Random Access Memory), a nano floating gate memory (NFGM), a polymer random access memory (PoRAM), a magnetic random access memory (MRAM), or a ferroelectric random access memory (FRAM).

The 3D image sensor 700 may perform the first sensing and the second sensing. The 2D image sensor 800 may perform the third sensing. Each of the 3D image sensor 700 and the 2D image sensor 800 may include a sensing unit that employs a pixel array, a row driver, a CDS block, a counter block, a ramp signal generator, a control unit and a buffer as illustrated in FIG. 8. The CDS block may include a plurality of CDS circuits as in FIG. 2a, and each of the plurality of CDS circuits may include an auto-zero switch that connects a first input terminal to an output node in response to an auto-zero control signal during an auto-zero interval preceding the first comparison interval. Each of the plurality of CDS circuits may connect a first terminal of the auto-zero switch to a reference voltage in order to cutoff a leakage current flowing to the auto-zero switch in response to a first boosting control signal during first and second comparison intervals. During the first comparison interval, a first comparison operation may be performed on the ramp signal and the reset component of the input signal, and during the second comparison interval, a second comparison operation may be performed on the ramp signal and the image component of the input signal.

The user interface 640 may include at least one input device, such as a keypad, the buttons 643 and 645 or the touch screen 644, and/or at least one output device, such as the speaker 648 or the display device 641. The power supply 650 may supply an operating voltage to the mobile device 600.

The mobile device 600 or components of the mobile device 600 of the inventive concept can be packaged according to any of various packaging technologies such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (PMQFP), thin quad flat-pack (TQFP), small outline integrated circuit (SOIC), shrink small outline package (SSOP), thin small outline package (TSOP), thin quad flat-pack (TQFP), system in package (SIP), multi chip package (MCP), wafer-level fabricated package (WFP), and wafer-level processed stack package (WSP).

FIG. 19 is a block diagram illustrating an example of an interface used in a mobile device according to example embodiments of the inventive concept.

Referring to FIG. 19, a mobile device 2000 may be implemented as a data processing device (for instance, a portable phone, a personal digital assistant, a portable multimedia player, or a smart phone) that uses or supports an MIPI interface, and may include an application processor 2110, an image sensor 2140 and a display 2150.

A CSI host 2112 of the application processor 2110 can make serial communication with a CSI device 2141 of the image sensor 2140 through a camera serial interface (CSI). In one embodiment, the CSI host 2112 may include an optical serializer DES and the CSI device 2141 may include an optical serializer SER. A display serial interface (DSI) host 2111 of the application processor 2110 can make serial communication with a DSI device 2151 of the display 2150 through a display serial interface (DSI). In some embodiments, the DSI host 2111 may include an optical serializer SER and the DSI device 2151 may include an optical serializer DES.

In addition, the mobile device 2000 may further include an RF (radio frequency) chip 2160 which can make communication with the application processor 2110. Data may be transceived between a PHY 2113 of the mobile device 2000 and a PHY 2161 of the RF chip 2160 according to the MIPI (Mobile Industry Processor Interface) DigRF. In addition, the application processor 2110 may further include a DigRF MASTER 2114 to control data transmission according to the MIPI DigRF, and the RF chip 2160 may further include a DigRF SLAVE 2162 which is controlled by the DigRF MASTER 2114.

Meanwhile, the mobile device 2000 may include a global positioning system (GPS) 2120, a storage 2170, a microphone 2180, a DRAM 2185 and a speaker 2190. In addition, the mobile device 2000 may perform communication using an ultra wideband (UWB) 2210, a wireless local area network (WLAN) 2220 and a worldwide interoperability for microwave access (WIMAX) 2230. The structure and the interface of the mobile device 2000 as shown are for illustrative purposes only and should not be limited thereto.

Example embodiments of the inventive concept may be applied to various image sensors and image systems. For instance, example embodiments may be applied to various terminals, such as a mobile phone, a smart phone, a personal digital assistant (PDA), a portable multimedia player (PMP), a digital camera, a camcoder, a personal computer (PC), a music player, a portable game console and a navigation system.

The foregoing is illustrative of example embodiments of the inventive concept and is not to be construed as limiting thereof. Although a few example embodiments have been described, those skilled in the art will readily appreciate that many modifications are possible in the example embodiments without materially departing from the novel teachings and advantages of the inventive concept. Accordingly, all such modifications are intended to be included within the scope of the of the inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A correlated double sampling (CDS) circuit, comprising:
    a sampling circuit configured to perform a CDS operation on a reset component of an input signal and an image component of the input signal based on a ramp signal and configured to generate an output signal, the input signal being provided from a pixel array; and
    a switching circuit including an auto-zero switch configured to connect a first input terminal of the switching circuit to an output node in response to an auto-zero control signal during an auto-zero interval, the switching circuit being configured to connect a first terminal of the auto-zero switch to a reference voltage and to cutoff a leakage current flowing to the auto-zero switch in response to a first boosting control signal during a first comparison interval and a second comparison interval, the auto-zero interval preceding the first comparison interval,
    wherein a first comparison operation is performed on the ramp signal and the reset component during the first comparison interval,
    a second comparison operation is performed on the ramp signal and the image component during the second comparison interval,
    the input signal is applied to the first input terminal of the switching circuit, and
    the output signal is provided to the output node.

2. The CDS circuit of claim 1, wherein the sampling circuit comprises a comparator configured to compare the ramp signal and the input signal and configured to provide the output signal to the output node, the input signal being received at a first input terminal of the comparator, the ramp signal being received at a second input terminal of the comparator.

3. The CDS circuit of claim 2, wherein the first terminal of the auto-zero switch is connected to a connection node through which the first terminal of the auto-zero switch is connected both to the reference voltage and to the output node,
    the auto-zero switch includes a second terminal connected to the first input terminal of the switching circuit, and
    the switching circuit includes a first boosting switch connected between the connection node and the reference voltage, and a second boosting switch connected between the connection node and the output node.

4. The CDS circuit of claim 3, wherein the switching circuit is configured to receive a plurality of switching control signals including the auto-zero control signal, the first boosting control signal and a second boosting control signal,
    the auto-zero control signal is applied to the auto-zero switch,
    the first boosting control signal is applied to the first boosting switch, and
    the second boosting control signal is applied to the second boosting switch.

5. The CDS circuit of claim 4, wherein the auto-zero control signal turns on the auto-zero switch during the auto-zero interval,
    the first boosting control signal is activated in a precharge interval preceding the first comparison interval, and
    the second boosting control signal is activated complementarily with the first boosting control signal.

6. The CDS circuit of claim 5, wherein the auto-zero switch comprises an n-channel metal-oxide semiconductor (NMOS) transistor connected between the first input terminal of the switching circuit and the connection node, and
    the NMOS transistor includes a gate that receives the auto-zero control signal and a body to which a ground voltage is applied.

7. The CDS circuit of claim 6, wherein the reference voltage has a level of a power supply voltage.

8. The CDS circuit of claim 6, wherein the NMOS transistor is turned off after the auto-zero interval in response to the auto-zero control signal.

9. The CDS circuit of claim 6, wherein in response to the first boosting control signal, the first boosting switch is configured to connect the reference voltage and a first terminal of the NMOS transistor from the precharge interval and configured to increase a threshold voltage of the NMOS transistor.

10. The CDS circuit of claim 6, wherein in response to the second boosting control signal, the second boosting switch is configured to connect the connection node and the output node before the precharge interval and configured to disconnect the connection node and the output node from the precharge interval.

11. The CDS circuit of claim 5, wherein the auto-zero switch comprises a p-channel metal-oxide semiconductor (PMOS) transistor connected between the first input terminal of the switching circuit and the connection node, and
   the PMOS transistor includes a gate that receives the auto-zero control signal and a body to which a ground voltage is applied.

12. The CDS circuit of claim 11, wherein the reference voltage has a level of a ground voltage.

13. The CDS circuit of claim 11, wherein the PMOS transistor is turned off after the auto-zero interval in response to the auto-zero control signal.

14. The CDS circuit of claim 11, wherein in response to the first boosting control signal, the first boosting switch is configured to connect the reference voltage and a first terminal of the PMOS transistor from the precharge interval and configured to increase a threshold voltage of the PMOS transistor.

15. The CDS circuit of claim 5, wherein the ramp signal has a starting level before the precharge interval and has an offset level higher than the starting level during the precharge interval, and
   the input signal has a reset level before the precharge interval.

16. The CDS circuit of claim 2, wherein the comparator comprises:
   a bias unit connected between a power supply voltage and a first node; and
   a comparison unit connected between the bias unit and a ground voltage, the comparison unit being configured to compare the ramp signal and the input signal to generate the output signal.

17. A correlated double sampling (CDS) circuit, comprising:
   a sampling circuit configured to perform a CDS operation on a reset component of an input signal and an image component of the input signal based on a ramp signal and configured to generate an output signal, the input signal being provided from a pixel array;
   a first switching circuit including a first auto-zero switch configured to connect a first input terminal of the CDS circuit to a first output node in response to an auto-zero control signal during an auto-zero interval, the first switching circuit being configured to connect a first terminal of the first auto-zero switch to a reference voltage and to cutoff a leakage current flowing to the first auto-zero switch in response to a first boosting control signal during a first comparison interval and a second comparison interval, the auto-zero interval preceding the first comparison interval; and
   a second switching circuit including a second auto-zero switch configured to connect a second input terminal of the CDS circuit to a second output node in response to the auto-zero control signal during the auto-zero interval, the second switching circuit being configured to connect a first terminal of the second auto-zero switch to the reference voltage and to cutoff a leakage current flowing to the second auto-zero switch in response to the first boosting control signal during the first comparison interval and the second comparison interval,
   wherein a first comparison operation is performed on the ramp signal and the reset component during the first comparison interval,
   a second comparison operation is performed on the ramp signal and the image component during the second comparison interval,
   the input signal is applied to the first input terminal of the CDS circuit,
   the ramp signal is applied to the second input terminal of the CDS circuit, and
   the output signal is provided to the first output node.

18. The CDS circuit of claim 17, wherein the sampling circuit comprises a differential comparator configured to compare the ramp signal and the input signal and configured to provide the output signal to the first output node,
   the first output node is connected to a positive output terminal of the differential comparator,
   the second output node is connected to a negative output terminal of the differential comparator,
   the input signal is received at a negative input terminal of the differential comparator, and
   the ramp signal is received at a positive input terminal of the differential comparator.

19. The CDS circuit of claim 18, wherein the first switching circuit comprises a first capacitor connected between the first input terminal of the CDS circuit and the negative input terminal of the differential comparator, the first capacitor being configured to store the input signal, and
   the second switching circuit comprises a second capacitor connected between the second input terminal of the CDS circuit and the positive input terminal of the differential comparator, the second capacitor being configured to store the ramp signal.

20. An image sensor comprising:
   a pixel array including a plurality of unit pixels configured to sense incident light and configured to generate pixel signals corresponding to the incident light;
   a correlated double sampling (CDS) block configured to perform a CDS operation on the pixel signals and configured to generate output signals, the CDS block including a plurality of CDS circuits, each of the plurality of CDS circuits being connected to each column line of the pixel array;
   a digital signal generation unit configured to perform a digital conversion operation on the output signals and configured to generate digital signals corresponding to the output signals; and
   a controller configured to provide control signals to the digital signal generation unit and the CDS block,
   wherein each of the plurality of CDS circuits comprises:
   a sampling circuit configured to perform the CDS operation on a reset component of each of the plurality of pixel signals and an image component of each of the plurality of pixel signals based on a ramp signal, the sampling circuit being configured to generate the output signals, and
   a switching circuit including an auto-zero switch configured to connect a first input terminal of the switching circuit to an output node in response to an auto-zero control signal during an auto-zero interval, the switching circuit being configured to connect a first terminal of the auto-zero switch to a reference voltage and to cutoff a leakage current flowing to the auto-zero switch in response to a first boosting control signal during a first comparison interval and a second comparison interval, the auto-zero interval preceding the first comparison interval, and
   wherein a first comparison operation is performed on the ramp signal and the reset component during the first comparison interval, a second comparison operation is performed on the ramp signal and the image component during the second comparison interval,
the pixel signals are applied to the first input terminal of the switching circuit, and
the output signals are provided to the output node.

* * * * *